(12) United States Patent
Carlson et al.

(10) Patent No.: US 6,366,599 B1
(45) Date of Patent: *Apr. 2, 2002

(54) FAST ACQUISITION OF SPREAD-SPECTRUM SIGNALS BY DYNAMICALLY VARYING SPACING OF SEARCH BINS

(75) Inventors: Andrew B. Carlson, Atherton; Jeffrey Crerie, San Francisco; David C. Westcott, Los Gatos; Paul F. Turney, Santa Clara, all of CA (US)

(73) Assignee: Trimble Navigation Limited, Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,521

(22) Filed: Mar. 16, 1998

(51) Int. Cl.⁷ .......................... H04L 27/30; H04B 7/185
(52) U.S. Cl. ........................................ 375/130; 342/357
(58) Field of Search .................. 375/130, 136, 375/137, 140; 370/342; 342/357, 192, 402, 418, 99, 120; 455/456

(56) References Cited

U.S. PATENT DOCUMENTS

| | | | | |
|---|---|---|---|---|
| 4,259,740 A | * | 3/1981 | Snell et al. .................. 375/346 |
| 4,785,463 A | * | 11/1988 | Janc et al. ................... 375/206 |
| 5,155,490 A | | 10/1992 | Spradley, Jr. et al. | |
| 5,199,101 A | | 3/1993 | Cusick et al. | |
| 5,343,209 A | | 8/1994 | Sennott et al. | |
| 5,347,284 A | | 9/1994 | Volpi et al. | |
| 5,414,729 A | | 5/1995 | Fenton | |
| 5,416,488 A | * | 5/1995 | Grover et al. ............... 342/159 |
| 5,477,458 A | | 12/1995 | Loomis | |
| 5,486,834 A | * | 1/1996 | Lennen ....................... 342/357 |
| 5,511,067 A | | 4/1996 | Miller | |
| 5,564,098 A | | 10/1996 | Rodal et al. | |
| 5,615,236 A | | 3/1997 | Turney | |
| 5,661,491 A | | 8/1997 | Jones | |
| 5,691,974 A | | 11/1997 | Zehavi et al. | |

(List continued on next page.)

Primary Examiner—Chi Pham
Assistant Examiner—Khai Tran
(74) Attorney, Agent, or Firm—Blakely, Sokoloff, Taylor & Zafman LLP

(57) ABSTRACT

A Global Positioning System (GPS) receiver employs variable spacing of Doppler offset bins and code offset bins when acquiring a P(Y) code, to improve signal acquisition characteristics with respect to a search region having a plurality of Doppler offset bins and code offset bins. The receiver includes an acquisition module in which an input signal representative of a received P(Y) code is received and applied to a first programmable rate mixer. An output of the first programmable rate mixer is applied to a combiner, which selectively combines samples of the input signal based on a control input to dynamically determine the spacing of the code offset bins. An output of the combiner is normalized and applied to a correlation unit, which generates correlation measures of the received P(Y) code and a locally generated P(Y) code. A signal representative of the correlation measures is applied separately to each of a set of programmable rate mixers and mixed with separate mixing signals. The spacing of the Doppler offset bins is dynamically determined by controlling the rates of the mixing signals.

40 Claims, 19 Drawing Sheets

U.S. PATENT DOCUMENTS

| | | | |
|---|---|---|---|
| 5,717,403 A | * | 2/1998 | Nelson et al. ............... 342/357 |
| 5,748,891 A | | 5/1998 | Fleming et al. |
| 5,799,010 A | | 8/1998 | Lomp et al. |
| 5,831,570 A | | 11/1998 | Ammar et al. |
| 5,867,489 A | | 2/1999 | Hershey et al. |
| 5,896,304 A | | 4/1999 | Tiemann et al. |
| 5,899,957 A | | 5/1999 | Loomis |
| 5,901,183 A | | 5/1999 | Garin et al. |
| 5,912,644 A | | 6/1999 | Wang |
| 5,963,582 A | | 10/1999 | Stansell, Jr. |
| 5,982,811 A | | 11/1999 | Harrison et al. |
| 5,987,059 A | * | 11/1999 | Harrison et al. ............. 375/150 |
| 6,002,708 A | | 12/1999 | Fleming et al. |
| 6,006,096 A | * | 12/1999 | Trompower ................. 455/456 |
| 6,009,118 A | | 12/1999 | Tiemann et al. |
| 6,018,704 A | | 1/2000 | Kohli et al. |
| 6,023,489 A | * | 2/2000 | Hatch ......................... 375/208 |
| 6,028,883 A | | 2/2000 | Tiemann et al. |
| 6,028,887 A | * | 2/2000 | Harrison et al. ............. 375/140 |
| 6,047,017 A | | 4/2000 | Cahn et al. |
| 6,049,535 A | | 4/2000 | Ozukturk et al. |
| 6,052,405 A | | 4/2000 | Nakano |
| 6,064,688 A | | 5/2000 | Yanagi |
| 6,069,915 A | * | 5/2000 | Hulbert ...................... 375/150 |
| 6,091,785 A | | 7/2000 | Lennen |
| 6,104,978 A | | 8/2000 | Harrison et al. |
| 6,111,541 A | | 8/2000 | Karmel |
| 6,118,808 A | | 9/2000 | Tiemann et al. |
| 6,121,923 A | | 9/2000 | King |
| 6,125,325 A | | 9/2000 | Kohli |
| 6,151,353 A | | 11/2000 | Harrison et al. |
| 6,157,619 A | | 12/2000 | Ozluturk et al. |
| 6,160,841 A | | 12/2000 | Stansell, Jr. et al. |
| 6,181,911 B1 | | 1/2001 | Sih et al. |
| 6,188,351 B1 | | 2/2001 | Bloebaum |
| 6,195,041 B1 | | 2/2001 | Gardner et al. |
| 6,198,375 B1 | | 3/2001 | Cahn et al. |

* cited by examiner

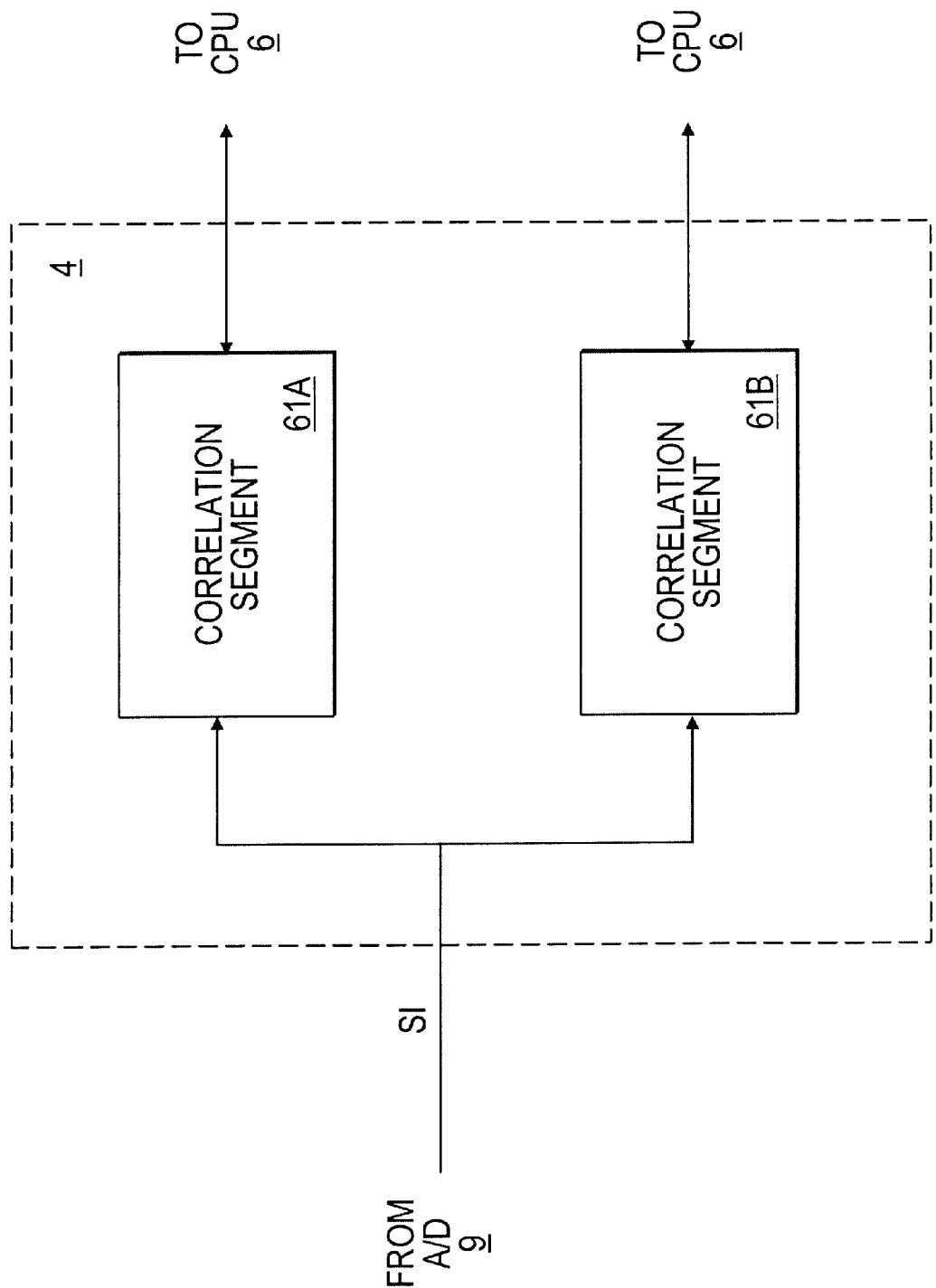

FAST ACQUISITION OF SPREAD-SPECTRUM SIGNALS BY DYNAMICALLY VARYING SPACING OF SEARCH BINS

FIELD OF THE INVENTION

The present invention pertains to acquisition of spread-spectrum signals. More particularly, the present invention relates to spread-spectrum signal acquisition in a Global Positioning System (GPS) receiver.

BACKGROUND OF THE INVENTION

Signal acquisition in a Global Positioning System (GPS) receiver generally requires searching for a modulation code in a carrier signal that is received from a GPS satellite. GPS generally makes use of two spread-spectrum modulation codes known as the "C/A code" and the "P code", which are multiplexed in quadrature onto a single carrier. The C/A code is a Gold code with a chipping rate of 1.023 Mbits/sec and is used for making course position determinations. The P code is a pseudo-random code with a chipping rate of 10.23 Mbits/sec and is used for more precise position determinations. The P code is more resistant to jamming than the C/A code and has a secure, "antispoof" version known as the Y code. The Y code is available only to authorized users, such as the military. The P code and the Y code are sometimes referred to collectively as the P(Y) code. In GPS receivers as well as other applications, it is desirable to reduce the time needed to acquire a modulation signal, particularly for military applications, in which jamming and other types of interference may be encountered.

Code acquisition in a GPS receiver is generally accomplished by comparing the received code with a reference code generated locally within the receiver in order to synchronize the two codes. The time required to acquire the signal is generally dependent upon frequency and phase uncertainties between the received code and the reference code. Consequently, acquisition of the received code generally involves searching a two-dimensional search region defined by a number of code offset values in one dimension and a number of frequency offset values, sometimes referred to as Doppler offset values, in the other dimension. The code offsets represent different values of phase offset between the received code and the reference code, while the frequency offsets represent different values of frequency offset between the received code and carrier and the reference code and carrier. The code and frequency offset values which define the search region are sometimes referred to as "bins".

Thus, referring to FIG. 1, the acquisition of a P(Y) code received from a GPS satellite is performed by searching for a signal 20 within a search region 21. The search region 21 is defined in terms of a number of code offset bins along one axis and a number of frequency offset bins along a second axis. Element 22 in FIG. 1 represents a bin. The signal acquisition time is the time from the start of the search until a bin is determined to be occupied or "hit".

The process of synchronizing the locally-generated code to the received code in a GPS receiver often involves computing the correlation between the two codes at various points in time. Referring to FIG. 2A, two correlation curves 31 and 32 are associated with two adjacent code offset bins. In the direction of code offset, the shape of the correlation function may be a series of overlapping triangles, the peaks of which are centered at the midpoint of each code offset bin, and the troughs of which fall halfway between each bin. The width of each bin is the width of each triangle at the code offset axis. Although the bins overlap, the midpoints of the bins are spaced apart by C chips; hence, the bins are said to be spaced apart by C chips. The rate at which a search region may be covered generally depends upon the number of parallel search bins and the degree of overlap of adjacent bins. The most adverse condition in terms of signal correlation is for the received signal to be located exactly midway between the center points of adjacent bins. For example, FIG. 2A illustrates that signal correlation is strongest when the actual code offset corresponds to the center of a bin and weakest when the offset corresponds to the trough 33 between two bins. Signal acquisition time, therefore, depends partially upon the "depth" of the trough 33. The depth of the trough 33, in turn, is directly dependent upon the spacing of the bins. If the bins are spaced farther apart, the total number of bins to be searched within a given search region may be reduced; however, the overall acquisition time may increase due to the increased trough depth. These principles, therefore, give rise to a design trade-off between bin spacing and signal acquisition speed.

FIG. 2B shows a relationship between frequency offset and signal correlation. In the direction of frequency offset, the shape of the correlation function is a series of overlapping sinc(x) curves, the peaks of which are centered at the midpoint of each frequency offset bin and the troughs of which fall halfway between each bin. Curves 34 and 35 represent the correlation curves associated with two adjacent frequency offset bins. The bins associated with curves 34 and 35 overlap but are spaced apart by F Hz. The width of the frequency offset bins is the width between the nulls of each sinc(x) curve at the frequency offset axis. As with code offset, the depth of the trough 36 depends partially upon the spacing of the bins.

GPS receivers conventionally use Fast Fourier Transform (FFT) techniques for signal acquisition. One problem associated with FFT-based receivers, however, is that the spacings of code offset bins and frequency offset bins are fixed. In conventional parallel search devices, the spacing of successive code offset bins is determined by the sampling rate of the analog to digital converter. Similarly, the spacing of frequency offset bins is determined by FFT-derived frequencies, which, in turn, are a function of the analog-to-digital sampling rate. Consequently, in conventional GPS receivers which use FFTs for code acquisition, the spacing between bins may be optimal for a given device and signal environment, yet poor for other devices and signal environments.

Another problem generally associated with code acquisition in GPS receivers is loss due to "code smearing", i.e., losses which result when the received code is not synchronized with the reference code over the entire correlation interval due to code Doppler. Code smearing tends to be worse in the outer frequency offset bins and often results from a total frequency offset that is too wide, resulting in divergence of the code and carrier frequencies. Because of their fixed bin spacing, FFT-based receivers tend to be highly susceptible to code smearing losses.

Hence, it is generally desirable to reduce signal acquisition time and losses when acquiring a spread-spectrum signal in a changeable signal environment. More specifically, it is desirable to reduce acquisition time and code smearing losses during acquisition of modulation codes in a GPS receiver under variable signal conditions.

SUMMARY OF THE INVENTION

One aspect of the present invention is a method of searching for a signal within a search region defined in terms of a number of bins. The method includes varying the spacing of the bins and attempting to locate the signal in one of the bins. In specific embodiments, varying the spacing of the bins includes dynamically varying the spacing of the bins based on a current signal environment.

Another aspect of the present invention is a receiver for searching for a signal within a search region. The search region is defined in terms of a number of bins. The receiver includes an input stage for receiving and sampling an input signal. An accumulation stage is coupled to the input stage. The accumulation stage combines at least some of the samples based on a first control input, such that the spacing of the bins is variable based on the first control input.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 6 illustrates a search stage of a GPS receiver according to an embodiment of the present invention.

DETAILED DESCRIPTION

A method and apparatus are described for acquiring a spread-spectrum signal by dynamically varying the spacing of frequency ("Doppler") offset bins and code offset bins. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram or other symbolic form in order to facilitate description of the present invention.

The present invention is particularly suited for use in a massively parallel GPS receiver for fast acquisition of P(Y) or C/A codes. For purposes of the present invention, the term "P(Y) code" is used to collectively refer to either a P code or a Y code associated with GPS. In accordance with the present invention, the spacing of code offset bins, Doppler offset bins, or both, are varied automatically and dynamically (i.e., while the receiver is attempting to locate the received signal) based on variables such as satellite signal strength, the presence of noise or jamming, code uncertainty, frequency uncertainty, etc., to reduce the signal acquisition time for a given receiver and/or signal environment. For example, a wider bin spacing can be used to reduce the total search time when a strong signal is present, while a narrower spacing might be used to reduce losses when a weak signal is present or the signal is being jammed. It will be recognized that the present invention can be used in many other applications. Hence, the present invention is not limited to use for acquiring the aforementioned codes, nor is the present invention limited to use in a positioning system.

Certain aspects of the present invention are described herein in the form of particular hardware or software components. Note, however, that such components generally may be embodied in either hardware or software, or in a combination of hardware and software, within the scope of the present invention.

Figure 1:
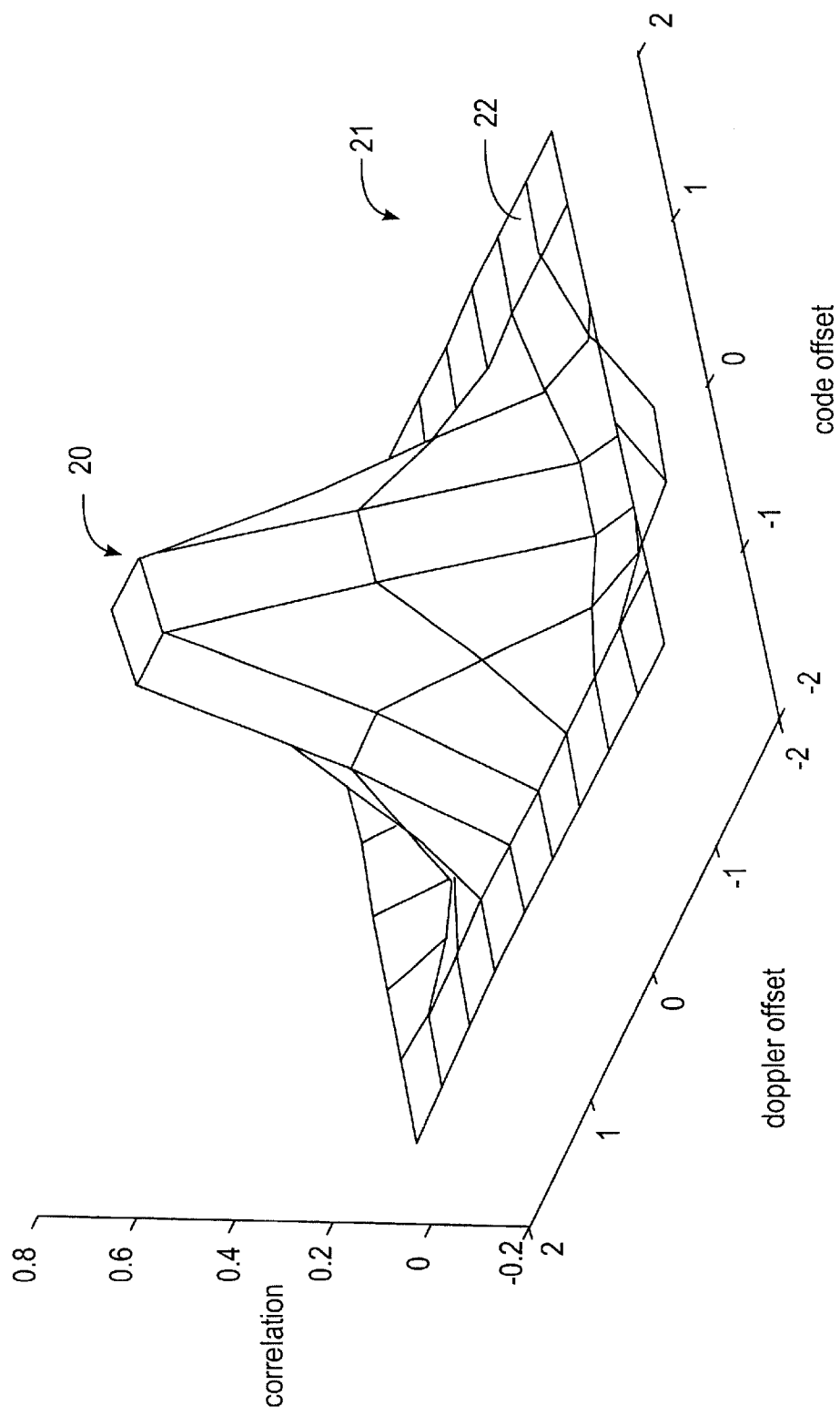
FIG. 1 illustrates a search region defined in terms of a number of frequency offset bins and a number of code offset bins.
Figure 2A:
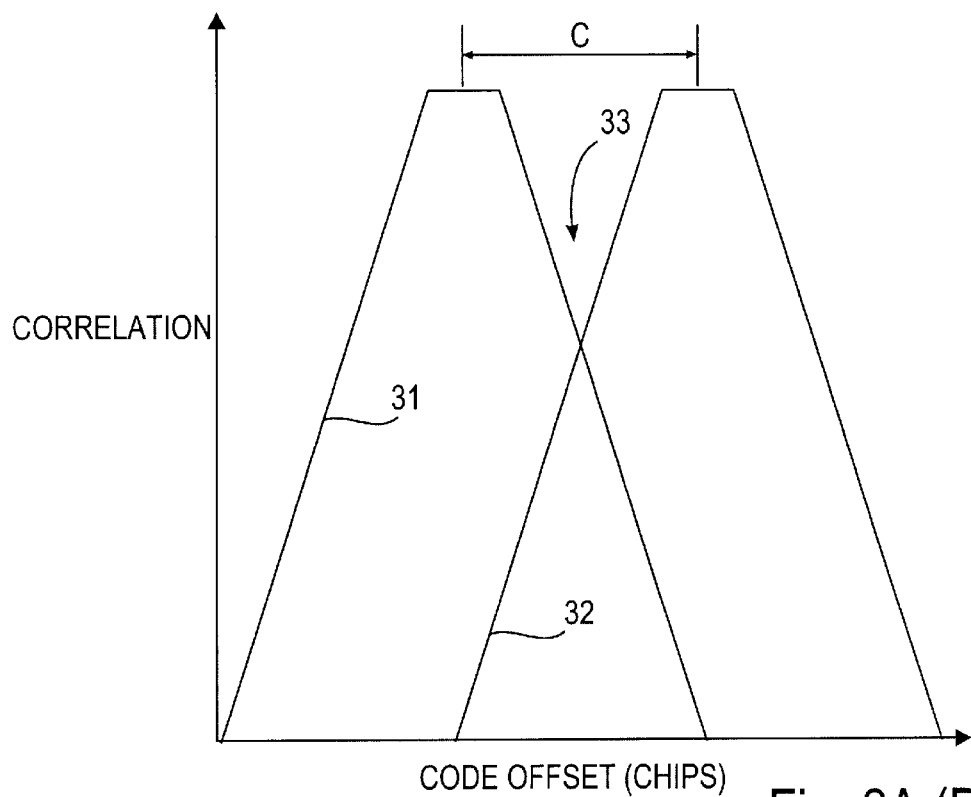
FIG. 2A illustrates a correlation function for two adjacent code offset bins.
Figure 2B:
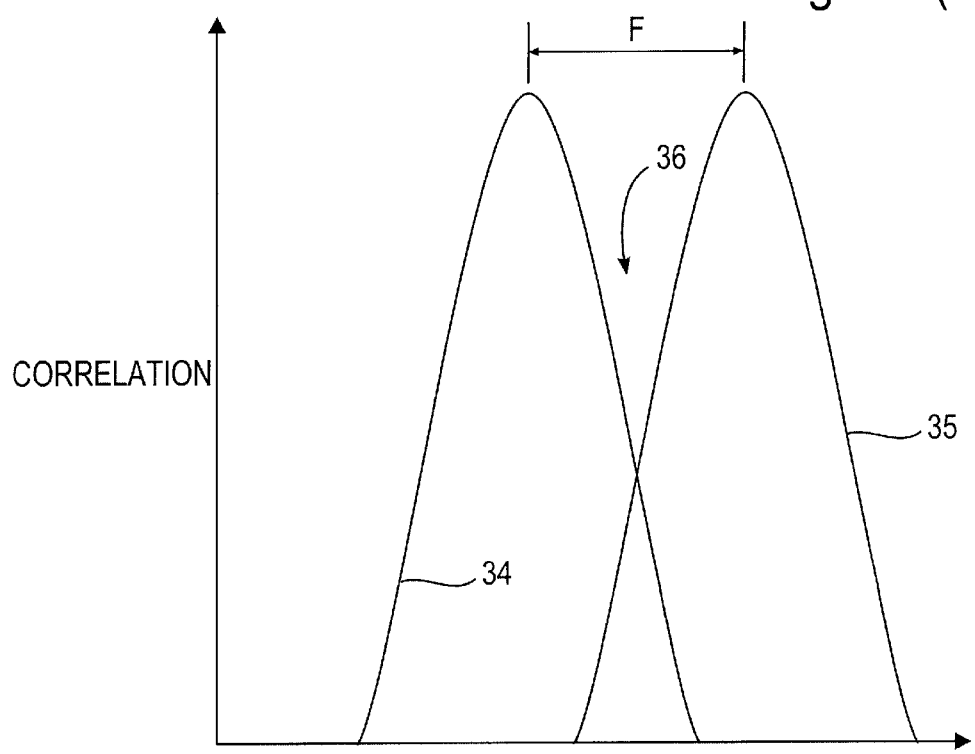
FIG. 2B illustrates a correlation function for two adjacent frequency offset bins.
Figure 3:
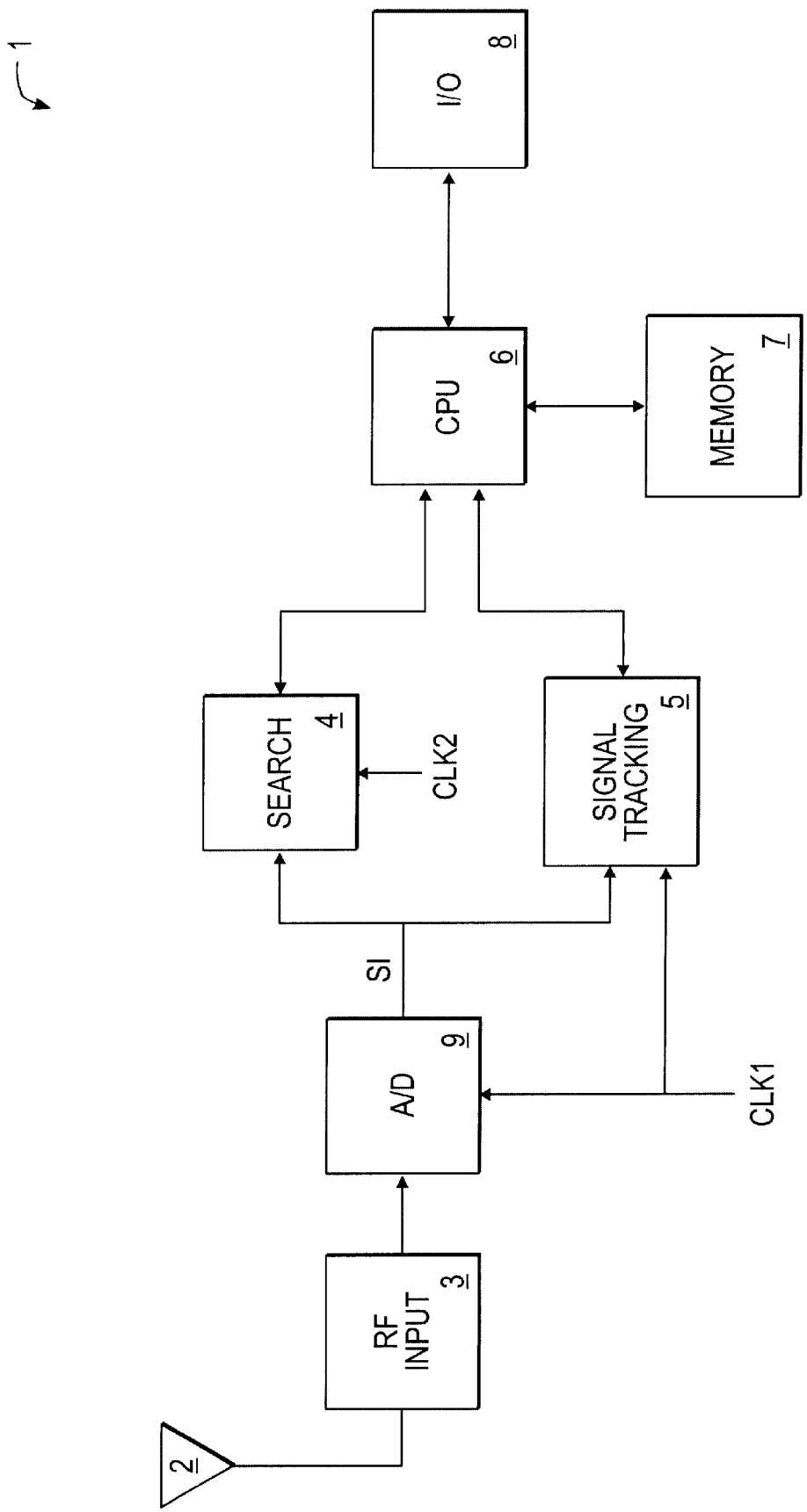
FIG. 3 is a block diagram of a GPS receiver.

FIG. 3 illustrates an example of a GPS receiver 1 in which the present invention can be implemented. The receiver 1 includes an antenna 2, a radio frequency (RF) input stage 3, a search stage 4, a tracking stage 5, a central processing unit (CPU) 6, a memory 7, an input/output (I/O) subsystem 8, and an analog-to-digital (A/D) converter 9. A modulated L1 or L2 GPS carrier signal is received by the receiver 1 at antenna 2 and input to the RF input stage 3. The RF input stage 3 amplifies and filters the received signal, down converts the frequency of the received signal to one that is more manageable, and outputs the resulting signal to the A/D converter 9. The A/D converter 9 samples the signal received at its input and outputs the samples SI to both the search stage 4 and the tracking stage 5. Note that in other embodiments, separate A/D samplers may be used for the search stage 4 and the tracking stage 5. The search stage 4 is responsible for locating the C/A code and P(Y) code within a given search region, while the signal tracking stage 5 is responsible for locking onto these signals, i.e., maintaining alignment of the received signal with a locally-generated reference signal. Search stage 4 can search multiple Doppler bins and multiple code offset bins in parallel. As will be described below, the present invention is directed to the search stage 4.

The search stage 4 and the tracking stage 5 each provide an output to, and receive control inputs from, the CPU 6. The CPU 6 has a bi-directional connection to memory 7 and to I/O subsystem 8. The memory 7 may be used to store software instructions executable by the CPU 6, various types of data, or both. The I/O subsystem 8 includes a display device (not shown) for presenting navigation and positional information to the user and various user controls (not shown) for receiving user inputs.

In general, GPS receivers often use a common clock signal to provide timing for sampling, searching, and tracking functions. In contrast, the receiver 1 uses a separate clock signal for purposes of signal acquisition (searching) from that used for sampling and signal tracking. It is advantageous to use two separate clock signals, because the acquisition circuitry can tolerate a significantly higher phase noise in its clock signal than the sampling and tracking stages can, even though they require the same frequency stability. In the receiver 1, clock signal CLK1 drives the A/D converter 9 and the tracking stage 5 for purposes of sampling and tracking, respectively. A second clock signal CLK2 is provided to the search stage 4 for purposes of signal acquisition. Clock signal CLK1 is preferably from a very stable oscillator, the specific stability parameters of which are application dependent. The stability requirements of the clock signal CLK2 are less stringent than those of clock signal CLK1, however, because the phase error of clock signal CLK2 can be as large as half a bin for purposes of signal acquisition.

Figure 4A:
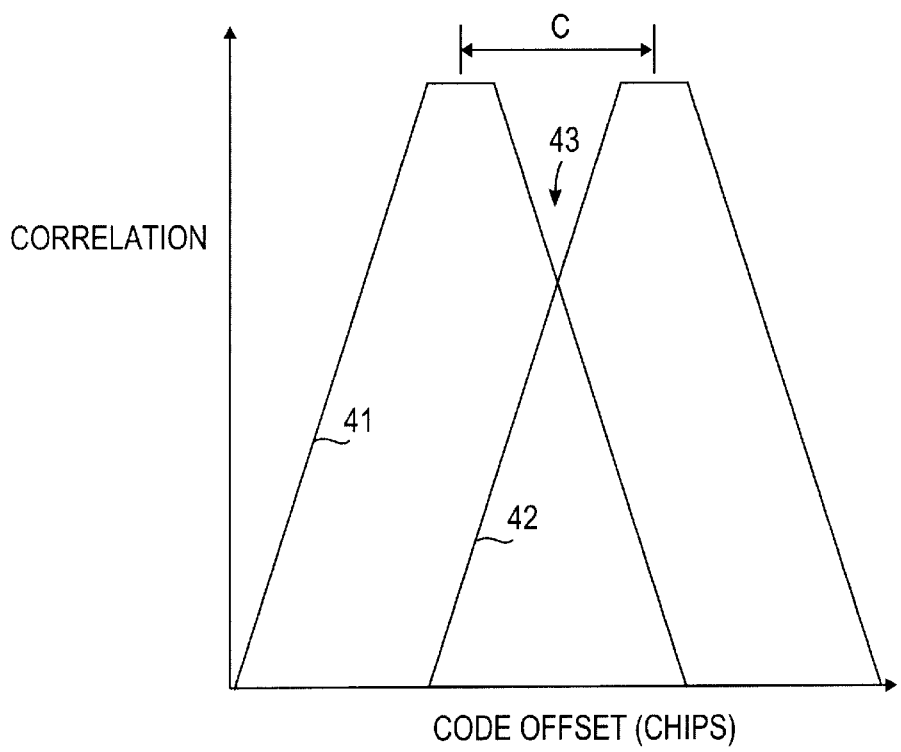
FIGS. 4A and 4B illustrate varying the spacing of code offset bins in terms of correlation.
Figure 4B:
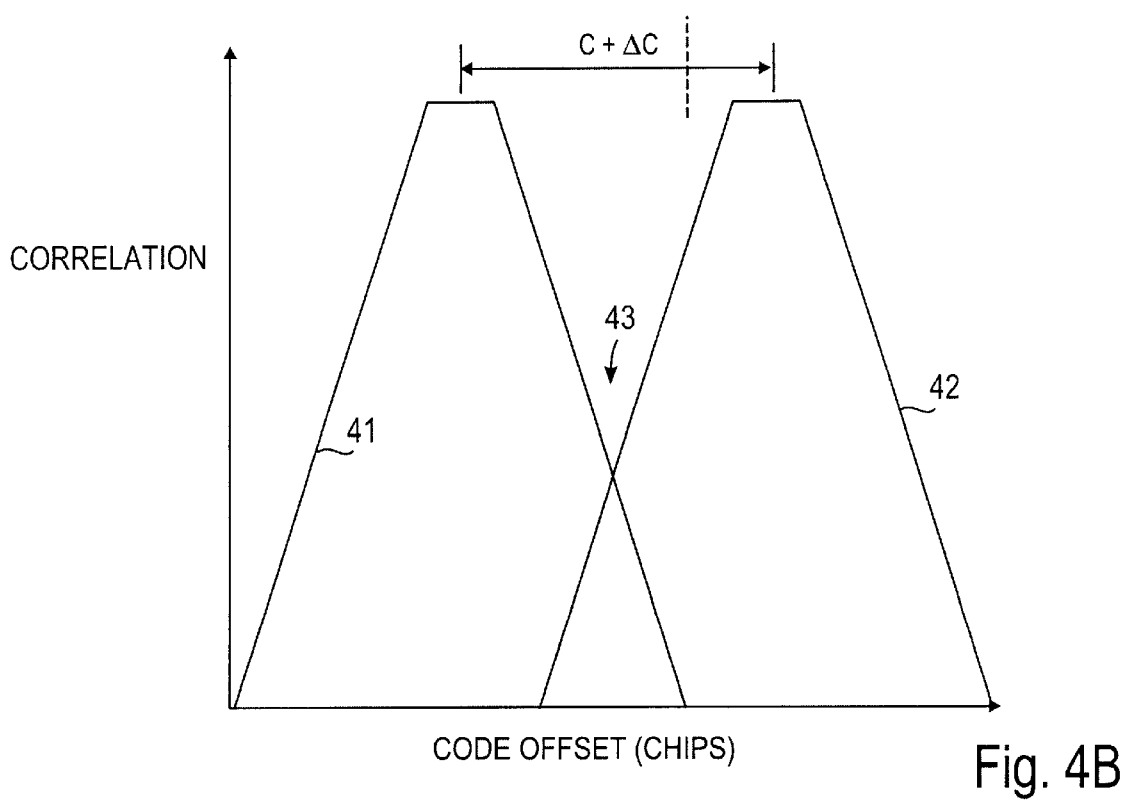

In accordance with the present invention, the spacing of Doppler offset bins, code offset bins, or both may be varied to best suit a particular receiver or signal environment. Refer to FIGS. 4A and 4B, which illustrate the effect of varying the code offset bin spacing on the signal correlation function. The manner in which the bin spacing is varied is described in detail below. FIG. 4A shows correlation curves 41 and 42 corresponding to two adjacent code offset bins. The bins are spaced apart by C code chips. FIG. 4B illustrates the same curves when the bin spacing has been increased to (C+ΔC) chips. It can be seen that increasing the spacing between the adjacent bins causes a deepening of the trough 43 between the two bins. The depth of the trough represents losses or attenuation of the correlated signal. Hence, a wider spacing might be used to accelerate a search where a strong signal is present, while a narrower spacing might be used to reduce losses where a weak signal is present or when the signal is being jammed. In addition, the variable bin spacing allows the size and shape of the search region to be tailored as desired without altering the number of bins that are searched.

Figure 5A:
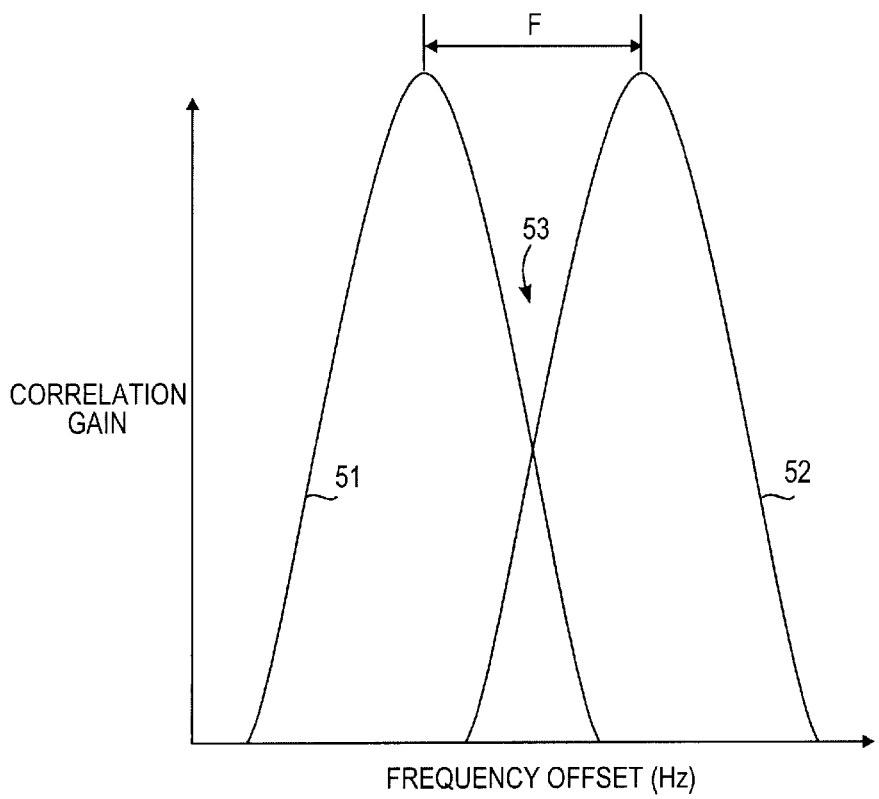
FIGS. 5A and 5B illustrate varying the spacing of frequency offset bins in terms of correlation.
Figure 5B:
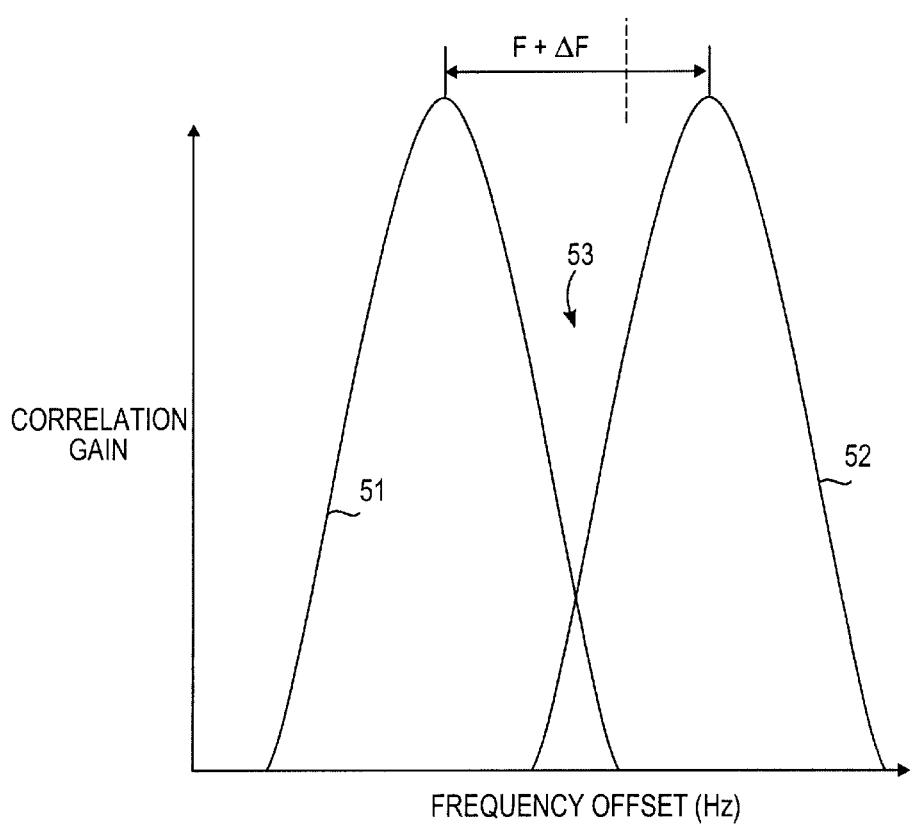

Similarly, as shown in FIGS. 5A and 5B, which illustrate the effect of varying the spacing between Doppler offset bins on correlation. The two correlation curves 51 and 52 are spaced apart by F Hz in FIG. 5A. As with code offset, a deepening of the trough 53 between the two bins also results when the Doppler offset bin spacing is increased to (F+ΔF) Hz. Thus, the varying of bin spacing can be used to control the depth of the trough between adjacent Doppler offset bins, code offset bins, or both.

One problem associated with code acquisition in a GPS receiver is "code smearing" loss, or loss which results when, as a result of code Doppler, the received code is not synchronized with the reference code over the entire correlation interval. The use of a single, shared reference code generator for all Doppler bins may result in divergence of the code and carrier frequencies. Code smearing tends to be worse in the outer Doppler bins and often results from a Doppler bin offset that is too wide. An advantage of the present invention is that bin spacing can be varied to reduce code smearing.

As noted above, the present invention relates to the search stage 4 (see FIG. 3). FIG. 6 shows the search stage 4 in greater detail, according to one embodiment of the present invention. In the illustrated embodiment, the search stage 4 includes two essentially identical correlation segments 61A and 61B. Each of correlation segments 61A and 61B receives the sampled input signal SI and is coupled to the CPU 6 for bi-directional communication of commands, addresses, and data. Such communication is provided using techniques that are well-known in the art. Each correlation segment can search a region comprising some number of code offset bins by some number of Doppler offset bins. In one embodiment, the correlation segments 61A and 61B are each configured to search a different set of 512 code offset bins by the same seven Doppler offset bins to cover an effective search region of 1,024 code offset bins by seven Doppler offset bins. An advantage of such an embodiment is that computations can be limited to only a few Doppler channels that are of interest. Note, however, that the present invention is not limited to any particular number of correlation segments, Doppler offset channels or bins, or code offset channels or bins, or to any particular size of search region.

Figure 7A:
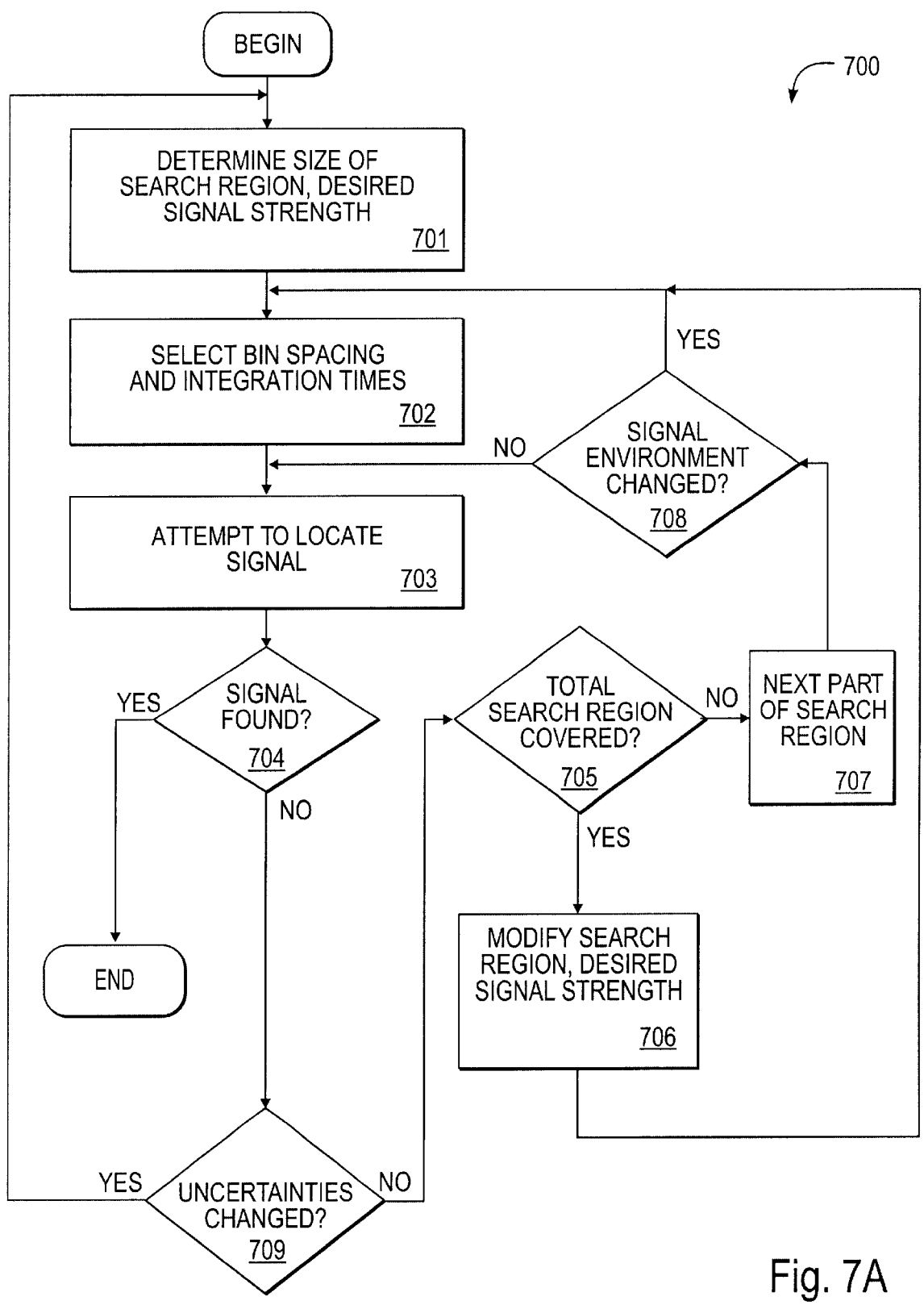
FIG. 7A is a flow diagram illustrating a routine for dynamically varying bin spacing.

The varying of the spacing of code offset bin spacing or Doppler offset bin spacing, or both may be implemented, in part, in each of the correlation segments 61A and 61B. FIG. 7A illustrates a routine 700 by which the spacing of either the code offset bins or the Doppler offset bins may be varied. At 701, the receiver 1 determines the size of the search region and the desired signal strength. At 702, the receiver 1 selects the bin spacing and integration times. The initial selection of bin spacing may be a default value. At 703, the receiver 1 attempts to locate a received signal, such as a P(Y) code, within a first set of bins. If the signal has been located within the total non-coherent integration period T_NCOH at 704, then the routine ends. If not, then the routine proceeds to 709, where it is determined whether the code or frequency uncertainties or the signal characteristics have changed. A change in uncertainty might result, for example, from a change in the dynamics of the receiver's platform, such as a high acceleration if the platform is a vehicle. If either the code or frequency uncertainty or signal characteristics have changed, then the routine repeats from 701 with an appropriate modification to the size of the search region and/or desired signal strength based on the current uncertainties and/or signal characteristics.

If there has been no change in the uncertainties or signal characteristics at 709, then the routine proceeds from 705. If not all bins of the search region have been covered at 705, then at 707 the next part of the search region is determined, and the routine proceeds to 708. At 708 it is determined whether the signal environment has changed. If not, the routine repeats from 702 by reselecting the bin spacing and integration times; otherwise the routine repeats from 703 by attempting to locate the signal.

If all bins of the search region have been covered at 705, then at 706 the bin search region is modified, and the routine repeats from 702. For example, the bin spacing may be reduced in order to reduce the depth of the troughs between bins and thereby increase the likelihood that a signal will be located. The amount by which the spacing is adjusted can be a default value, or it can be based on any of various dynamically computed parameters, such as satellite signal strength, jamming levels, code uncertainty, frequency uncertainty, desired probability of detection, etc. Note that numerous variations on the routine of FIG. 7A are possible within the scope of the present invention.

The algorithm used to select the bin spacings and integration time at 702 is based on minimizing the expected acquisition search time for the desired probability of detection of the signal. The algorithm generally combines parameters of the search region and search device capabilities with an empirical or statistical model to connect the probability of success or failure (to detect the signal) with a chosen combination of bin spacings and integration time.

Figure 7C:
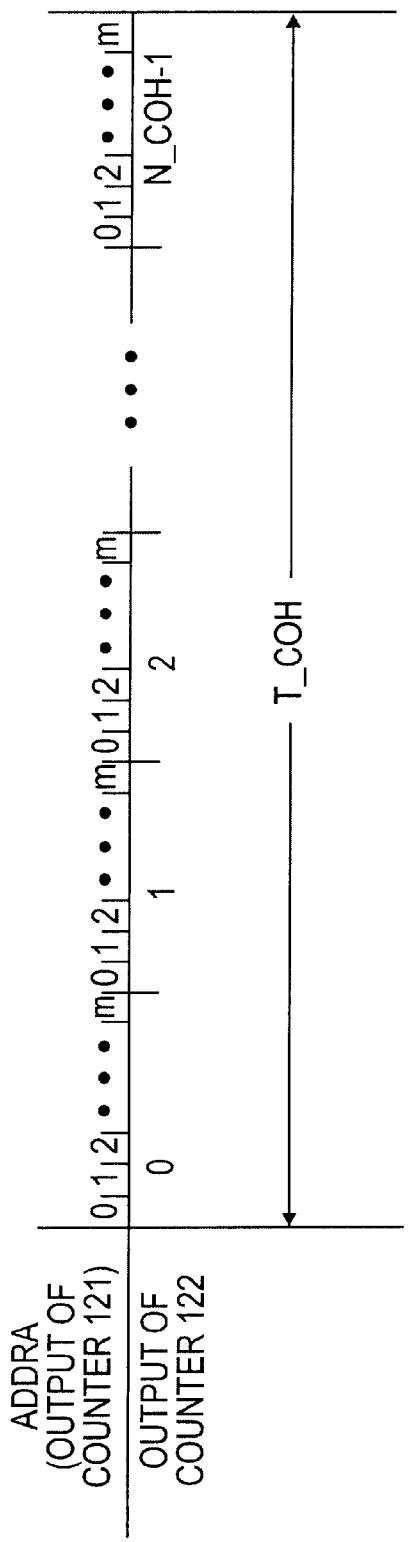
FIG. 7C illustrates the relationship between quantities N_COH, T_COH and m.
Figure 7B:
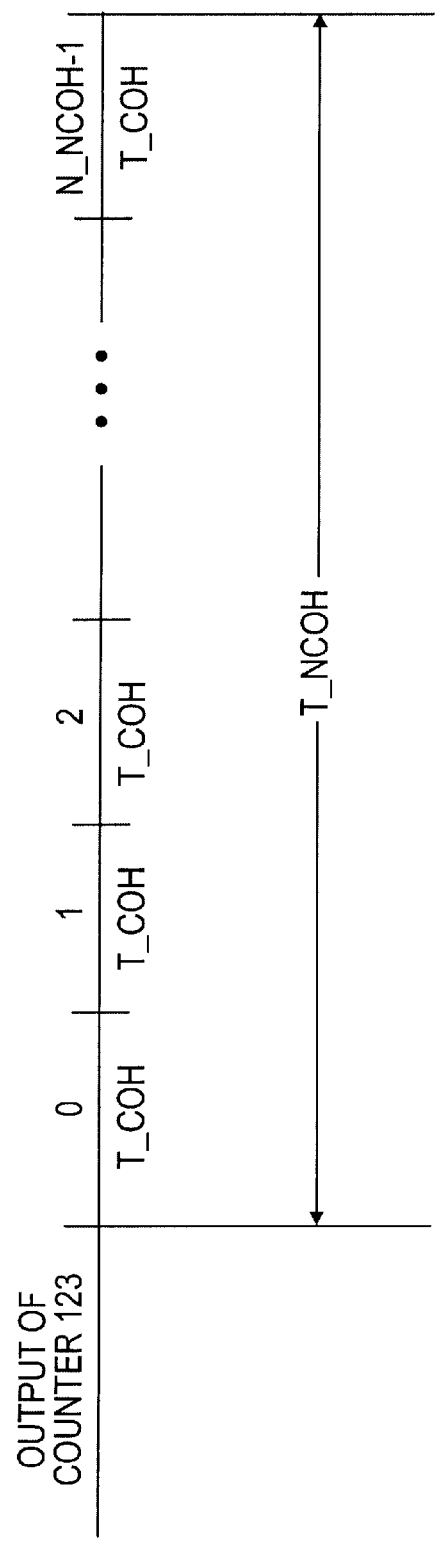
FIG. 7B illustrates the relationship between quantities N_NCOH, T_COH and T_NCOH.
Figure 7D:
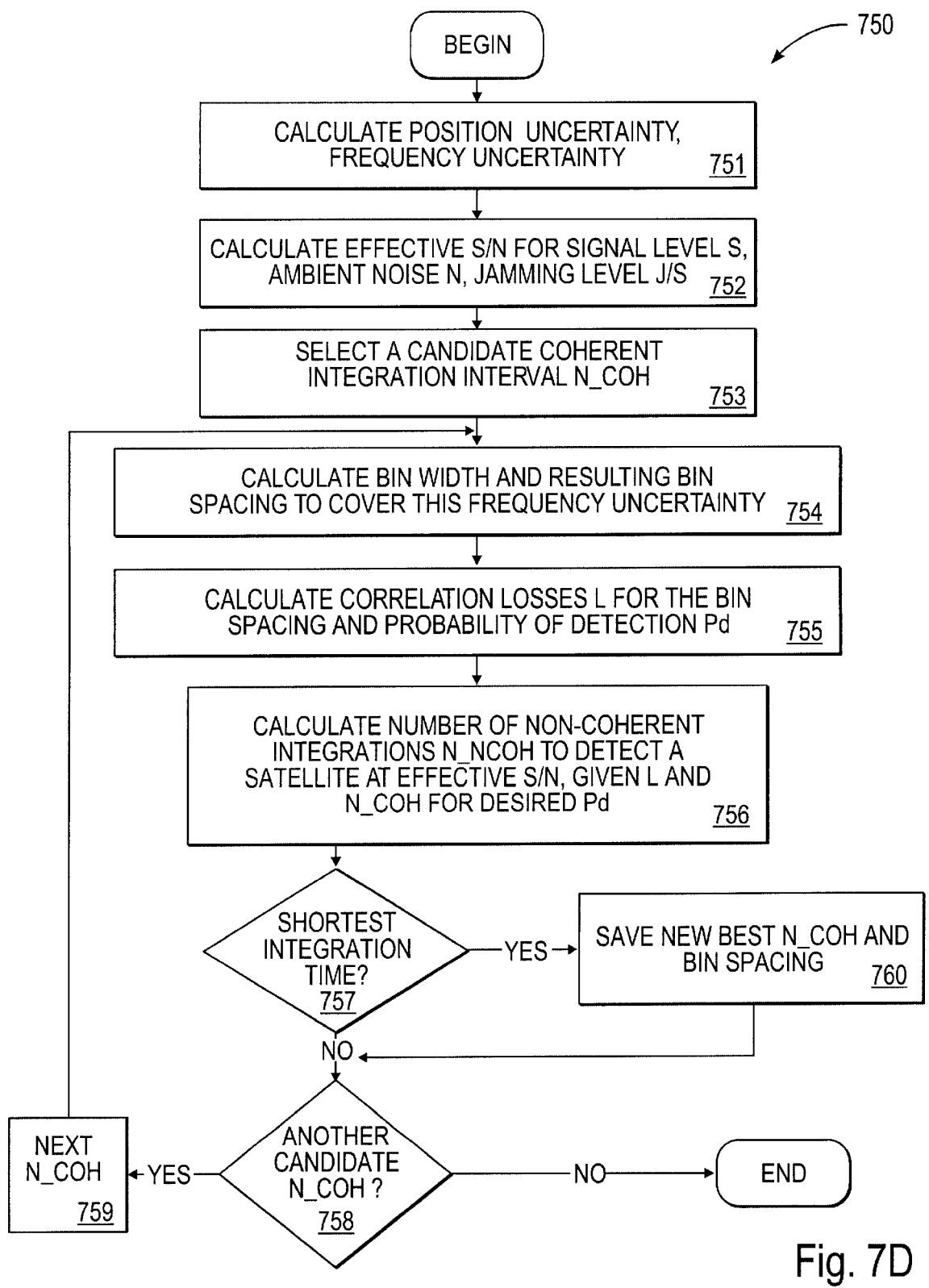
FIG. 7D is a flow diagram illustrating a routine for determining Doppler offset bin spacing according to a first embodiment.
Figure 7E:
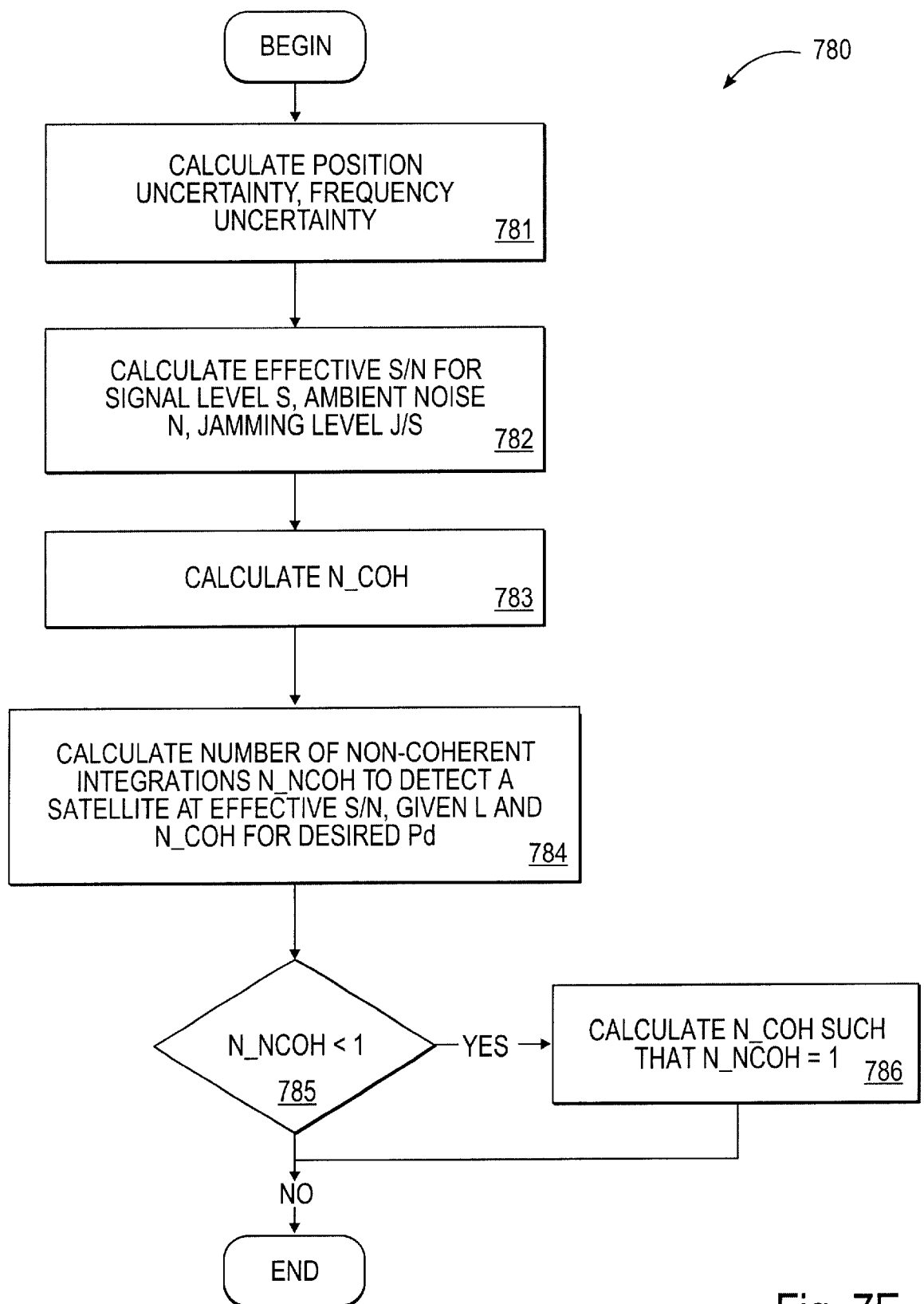
FIG. 7E is a flow diagram illustrating a routine for determining Doppler offset bin spacing according to a second embodiment.

FIGS. 7D and 7E illustrate examples of routines for selecting bin spacing, as performed in 702 above. Before discussing those routines, however, it may be useful to define certain terms. As indicated in the routine of FIG. 7A, the search stage 4 of receiver 1 attempts to locate a signal during a total non-coherent integration period T_NCOH (FIG. 7A, 703 and 704). Each non-coherent integration period T_NCOH comprises a number N_NCOH of non-coherent integrations, each of which has a coherent integration time T_COH. The relationship between the quantities T_COH and N_NCOH is illustrated in FIG. 7B. Each coherent integration time T_COH comprises a number N_COH of coherent integration cycles of a correlation segment. The relationship between the quantities T_COH and N_COH is illustrated in FIG. 7C. As will be discussed below, each of the N_COH coherent integration cycles comprises m subcycles, where m is equal to the number of code offset bins per correlation segment.

Referring now to FIG. 7D, a routine 750 for varying bin spacing is shown. Adjustment of bin spacings at 702 may involve varying the spacing of either Doppler offset bins, code bins, or both. In one embodiment, Doppler and code bin spacings are adjusted at 702 by testing candidate bin spacings according to a nested loop approach. More specifically, for each selected Doppler bin spacing, multiple code bin spacings are tested, one at a time, until all candidate bin spacings have been tested.

The routine 750 of FIG. 7D is for determining the spacing of Doppler offset bins, however, a similar routine can be used to determine the spacing of code offset bins, as will be discussed below. The Doppler offset bin spacing is determined by the number of coherent integration cycles N_COH used. Thus, at 751, the position uncertainty and frequency uncertainty are calculated. Next, at 752 the effective signal-to-noise ratio S/N is computed for the signal level S, ambient noise N, and jamming-to-signal ratio J/S. At 753, one of multiple candidate N_COH values is selected, and the following sequence is then performed for each candidate N_COH value. At 754 the bin width and resulting bin spacing is calculated to cover the frequency uncertainty previously computed (at 751). Next, at 755 the correlation losses L are calculated for current bin spacing and desired probability of detection Pd. At 756 the required number of non-coherent integrations N_NCOH needed to detect the presence of a satellite is calculated at the effective signal-to-noise ratio S/N, with the correlation losses L and currently selected N_COH, for the desired probability of detection Pd, is computed. In one embodiment, the computation of the number of non-coherent integrations at 756 is performed using a statistical model, as described in S. Mahmood et al., "An Analytical Study of Fast Acquisition Issues in GPS Exploitation for Electronic Combat", Proceedings, 7$^{th}$ International Technical Meeting of the Institute of Navigation, pp. 863–70, Sep. 20–23, 1994, Salt Lake City, Utah. As an alternative, this calculation might be performed as a linear best-fit computation. Next, at 757 it is determined whether the resulting total integration time T_NCOH is the shortest computed thus far. If not, the routine continues from 758. If so, then at 760 the current bin spacing and N_COH are saved as the "best" bin spacing and N_COH, and the routine continues from 758. If there are more candidate N_COH values to consider at 758, then at 759 the next N_COH value is selected, and the routine repeats from 754. Otherwise, the routine ends. The final "best" N_COH value is then used to control the Doppler bin spacing, in a manner which will be described below.

FIG. 7E illustrates an alternative routine for varying the Doppler offset bin spacing. Again, the Doppler offset bin spacing is determined by the number N_COH of coherent integration cycles used. This alternative routine uses a weighted sum of parameters to calculate the N_COH value needed to provide the shortest total non-coherent integration time T_NCOH. For example, the weighted sum might be computed as follows:

$$N\_COH = A + B \cdot Pd + C \cdot S/Nj + D \cdot (Uhz/NDop) \qquad (1)$$

where:
  Pd is the desired probability of detection;
  S/Nj is the effective signal-to-noise ratio corrected for jamming and other noise sensors, in dB;
  Uhz is the frequency uncertainty in Hz; and
  NDop is the number of Doppler bins.

For a specific implementation, the coefficients A, B, C and D may be calculated from a least squares fit covering the range of variation of the above parameters. For purposes of generating the data for fitting, the routine of FIG. 7B or experimental data can be used.

Thus, the weighted sum N_COH might be computed according to the routine 780 of FIG. 7E. At 781, the position uncertainty and frequency uncertainty are calculated. Next, at 782 the effective signal-to-noise ratio S/N is computed for the signal level S, ambient noise N, and jamming-to-signal ratio J/S. Next, at 783, N_COH is computed according to equation (1) above. At 784 the required number of non-coherent integrations N_NCOH needed to detect the presence of a satellite is calculated at the effective signal-to-noise ratio S/N, with the correlation losses L and N_COH, for the desired probability of detection Pd, is computed. The method described by Mahmood et al. may be used for this computation. At 785, if the resulting N_NCOH is less than one, then at 786 the number of coherent integration cycles N_COH is recomputed such that N_NCOH equals one, and the routine ends. If N_NCOH is equal to or greater than one at 785, then the routine ends.

Figure 8:
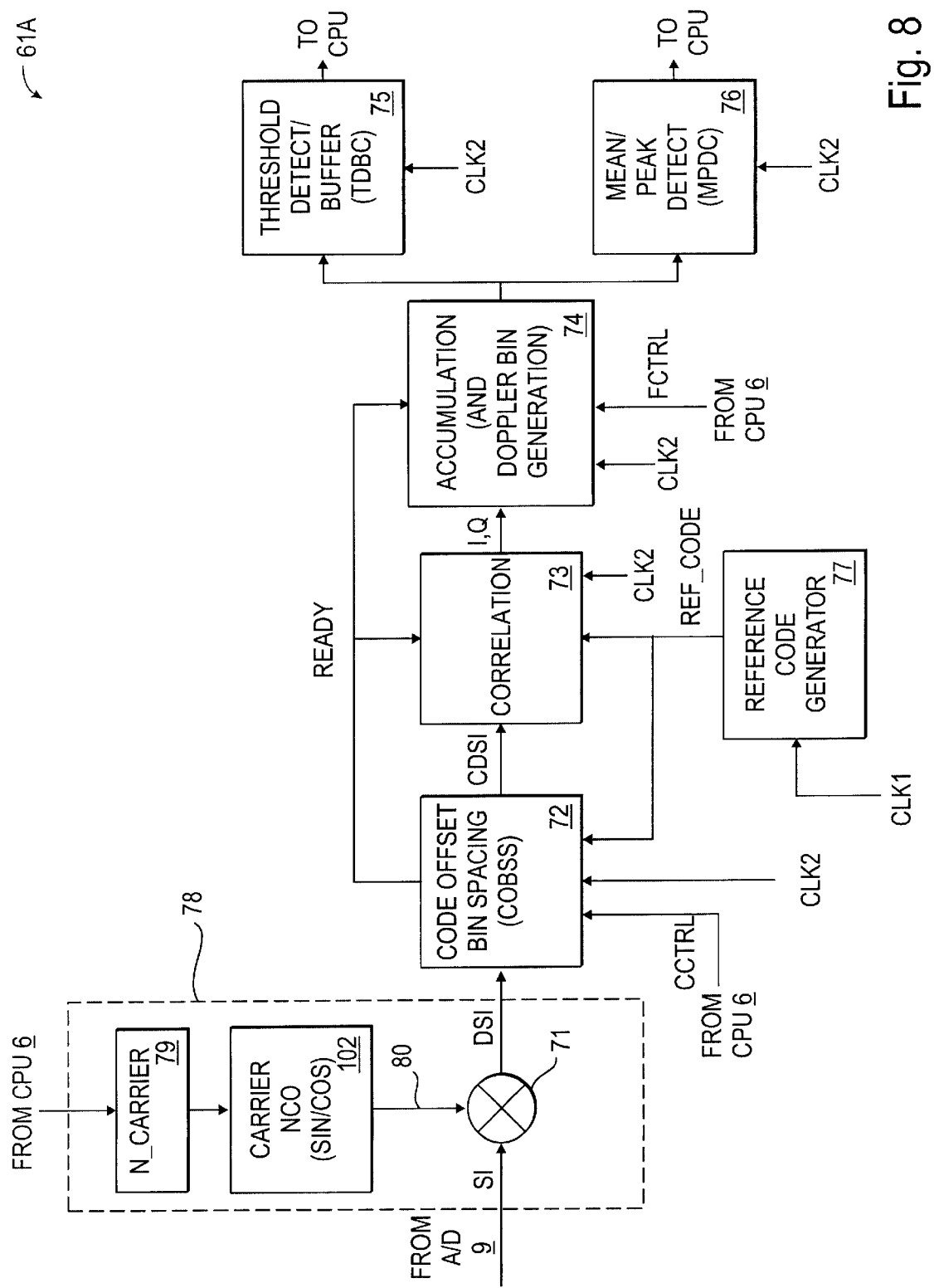
FIG. 8 is a block diagram of one of the correlation segments of FIG. 6.

FIG. 8 illustrates the segment 61A in greater detail. As noted above, segment 61B is essentially identical to segment 61A. Segment 61A includes a programmable-rate mixing stage 78, a code offset bin spacing stage (COBSS) 72, a correlation stage 73, a Doppler bin generation and accumulation stage 74, a threshold detection and buffer circuit (TDBC) 75, a mean and peak detection circuit (MPDC) 76, and a reference code generator 77.

The mixing stage 78 includes a register 79, a programmable-rate number-controlled oscillator (NCO) 102, sine/cosine look-up tables (not shown), and a mixer 71. The input signal SI includes a number of digital samples of the signal from A/D converter 9. The mixer 71 mixes the signal SI with signal 80 generated by NCO 102. Signal 80 includes both in-phase and quadrature (i.e., sine and cosine) components. The frequency of signal 80 output by NCO 102 is determined by the value that is stored in register 79, which is set by the CPU 6. The resulting mixed signal DSI includes both in-phase and quadrature components and is output by the mixer 71 to the COBSS 72.

The COBSS 72 receives the clock signal CLK2 and the output DSI of the mixer 71 and selectively combines samples of the mixed input signal DSI to vary the spacing between code offset bins. Note that the combining function is optional and can be bypassed, if appropriate. The combining of samples, which is described in greater detail below, is based on the clock signal CLK2 received by the COBSS 72 as well as a control input CCTRL received by the COBSS 72 from the CPU 6. The combined samples are output by the COBSS 72 as signal CDSI, which is provided to the correlation stage 73 as input. The COBSS also outputs a control signal READY to both the correlation stage 73 and the accumulation stage 74. The purpose of the READY signal is described below.

The reference code REF_CODE is generated locally by the reference code generator 77 and is provided as inputs to both the COBSS 72 and the correlation stage 73. Reference code generator 77 receives clock signal CLK1 as input. REF_CODE includes indications of the epoch.

The correlation stage 73 receives signal CDSI from the COBSS 72 and REF_CODE and outputs to the accumulation stage (separately) both in-phase and quadrature values of correlation between REF_CODE and the P(Y) code in the received signal at various points in time. The in-phase and quadrature correlation values are represented collectively as signal I,Q output from correlation stage 73. The correlation stage also receives clock signal CLK2. The accumulation stage 74 also receives clock signal CLK2 as well as control signals READY and N_NORM from the COBSS 72 and control signal FCTRL from the CPU 6, the purposes of which are described below.

The accumulation stage 74 is described in greater detail below. Generally, however, the accumulation stage 74 mixes correlation values in signal I,Q with signals of various different frequencies to create the desired Doppler offset bins and collects values over the period of a coherent integration interval. In addition, the accumulation stage includes components for dynamically varying the spacing of the Doppler offset bins, as necessary. The mixed results are accumulated, both coherently and non-coherently, and then output to both the TDBC 75 and the MPDC 76.

TDBC 75 applies a threshold function to the signal received at its input to provide a "hit" (signal found) indication to the CPU 6 and in which bin the hit occurred. MPDC 76 detects and outputs to the CPU 6 the mean and peak values of the signal received at its input. The mean and peak values are combined with other information available to the CPU 6 to determine the threshold values in the TDBC 75. TDBC 75 and MPDC 76 both are clocked by clock signal CLK2.

Figure 9A:
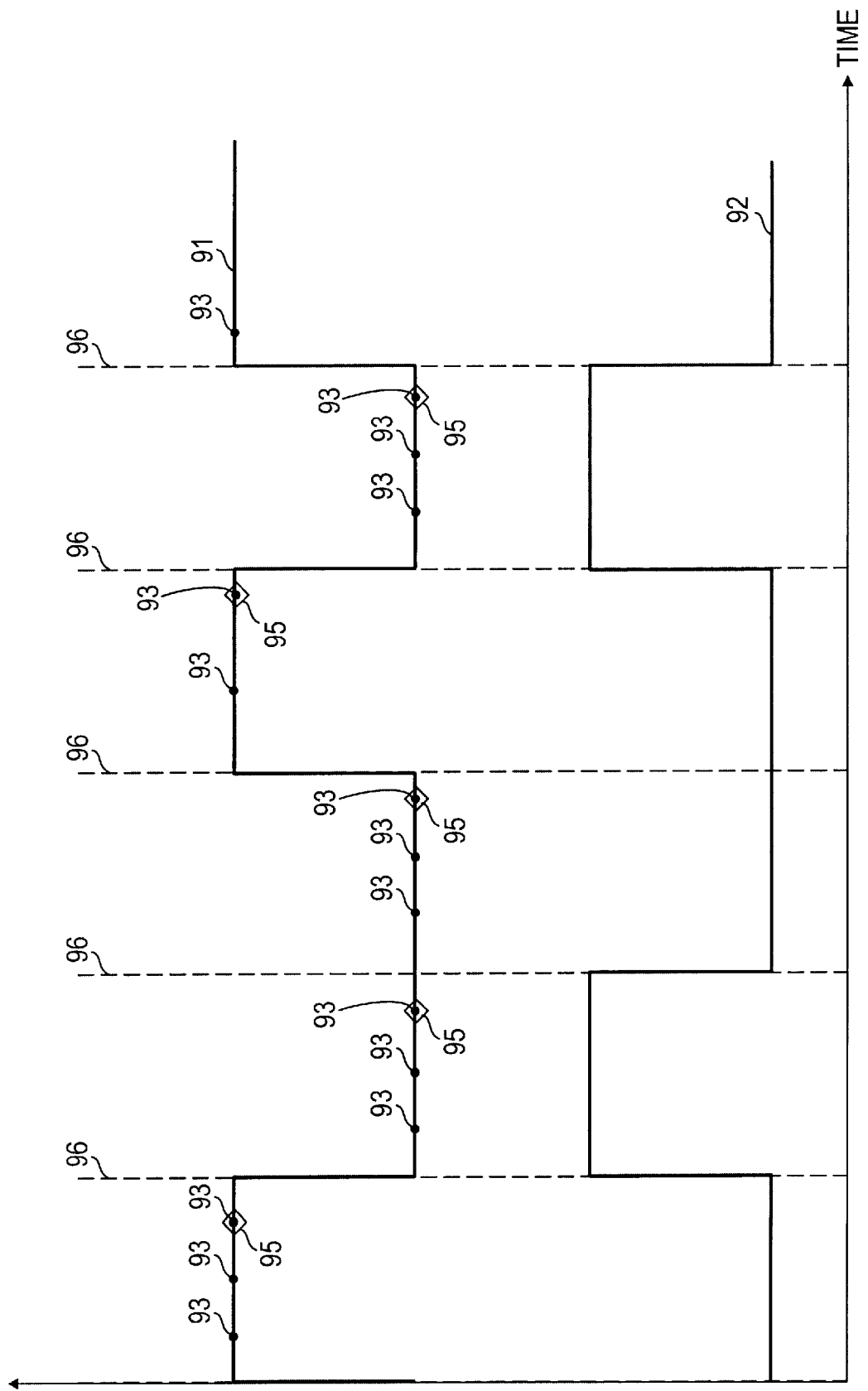
FIG. 9A is a signal diagram illustrating the combining of samples of a received code.

Refer now to FIG. 9A, which illustrates how samples of the input signal may be combined by the COBSS 72 to vary the spacing of code offset bins. In a GPS receiver, the minimum achievable spacing of code offset bins is generally the A/D sample period of the received signal. In accordance with the present invention, therefore, the code offset bin spacing can be increased by combining samples of the input signal. In one embodiment, the code offset bin spacing can be increased up to a maximum of one code chip. For example, if sampled at 20.46 MHz, up to two samples could be combined for the P(Y) code, or up to 20 samples could be combined for the C/A code. In FIG. 9A, waveform 91 represents the P(Y) code or C/A code in a received signal, while waveform 92 represents the locally-generated P(Y) or C/A reference code. For purposes of illustration only, the reference code is shown offset from the received code by one code chip. The received waveform 91 consists of a series of digital samples 93. In accordance with the present invention, samples 93 are combined (e.g., averaged together) by the COBSS 72 to form a number of combined samples available at times 95. The combining of the samples 93 effectively increases the spacing between code offset bins. Thus, the COBSS 72 is used to synthesize artificial sampling rates. The COBSS 72 is synchronized to the code chip rate to avoid combining samples across chip boundaries 96.

The combining of samples is done dynamically based on the current signal environment, i.e., satellite signal strength, noise and/or jamming levels, code uncertainty, frequency uncertainty, etc. The particular algorithm and/or criteria by which samples are combined (e.g., the frequency at which samples are combined, the number of consecutive samples that are combined into one sample, etc.) are determined by the CPU 6, which controls the COBSS via the control signal CCTRL.

Figure 9B:
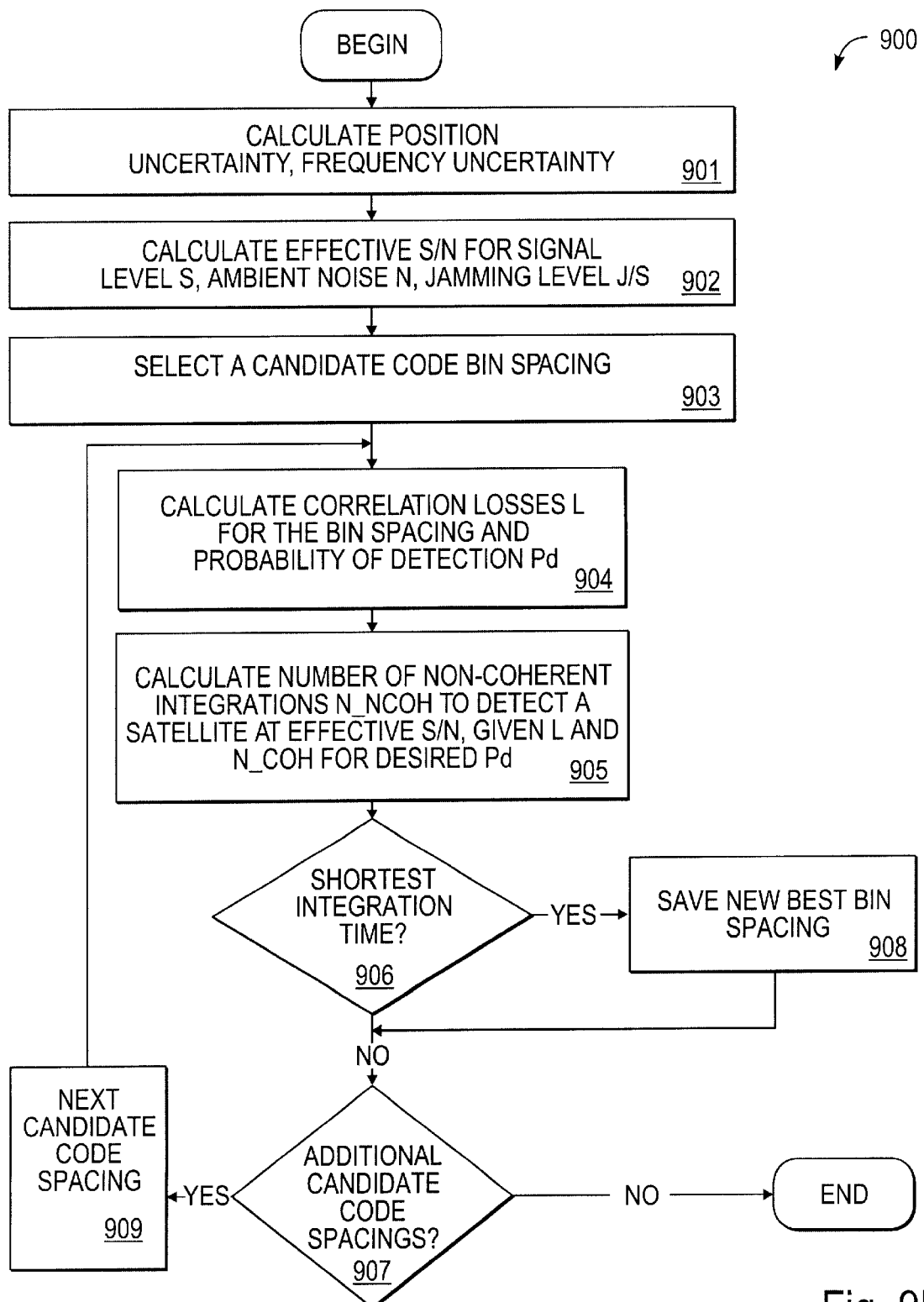
FIG. 9B is a flow diagram illustrating a routine for determining code offset bin spacing according to a first embodiment.

FIG. 9B illustrates an example of a relatively simple routine 900 for determining code bin spacing for a given coherent integration interval N_COH. At 901, the position and frequency uncertainties are calculated. At 902 the effective signal-to-noise ratio S/N is computed for the signal level S, ambient noise N, and jamming level J/S. At 903, one of multiple candidate code bin spacings is selected, and the following sequence is then performed for each candidate code bin spacing. At 904 the correlation losses L are calculated for the selected bin spacing and desired probability of detection Pd. At 905 the required number of non-coherent integrations N_NCOH needed to detect the presence of a satellite is calculated at the effective signal-to-noise ratio S/N, with the correlation losses L and currently selected N_COH, for the desired probability of detection Pd. The computation of the number of non-coherent integrations N_NCOH performed at 905 may be based on, for example, the method described by S. Mahmood et al., as noted above, or as a linear best-fit computation. Next, at 906 it is determined whether the resulting total integration time T_NCOH is the shortest computed thus far. If not, the routine continues from 907. If so, then at 908 the current bin spacing is saved as the "best" bin spacing, and the routine continues from 907. If there are more candidate bin spacings to consider at 907, then at 909 the next candidate bin spacing is selected, and the routine repeats from 904. Otherwise, the routine ends.

As with the determination of Doppler bin spacing, other methods of determining code bin spacing might also be used. For example, the code offset bin spacing may be computed as a weighted sum designed to provide the shortest total non-coherent integration time T_NCOH. The weighted sum might be computed as follows:

$$\text{Code offset bin spacing} = E + F \cdot Pd + G \cdot S/Nj + H \cdot Fsc \quad (2)$$

where:
- Pd is the desired probability of detection;
- S/Nj is the effective signal-to-noise ratio corrected for jamming and other noise sensors, in dB;
- Fsc is the ratio of the A/D sampling frequency to the code frequency.

For a specific implementation, the coefficients E, F, G and H may be calculated from a least squares fit for code bin spacing covering the range of variation of the above parameters. For purposes of generating the data for fitting, the routine of FIG. 9B or experimental data can be used.

Figure 9C:
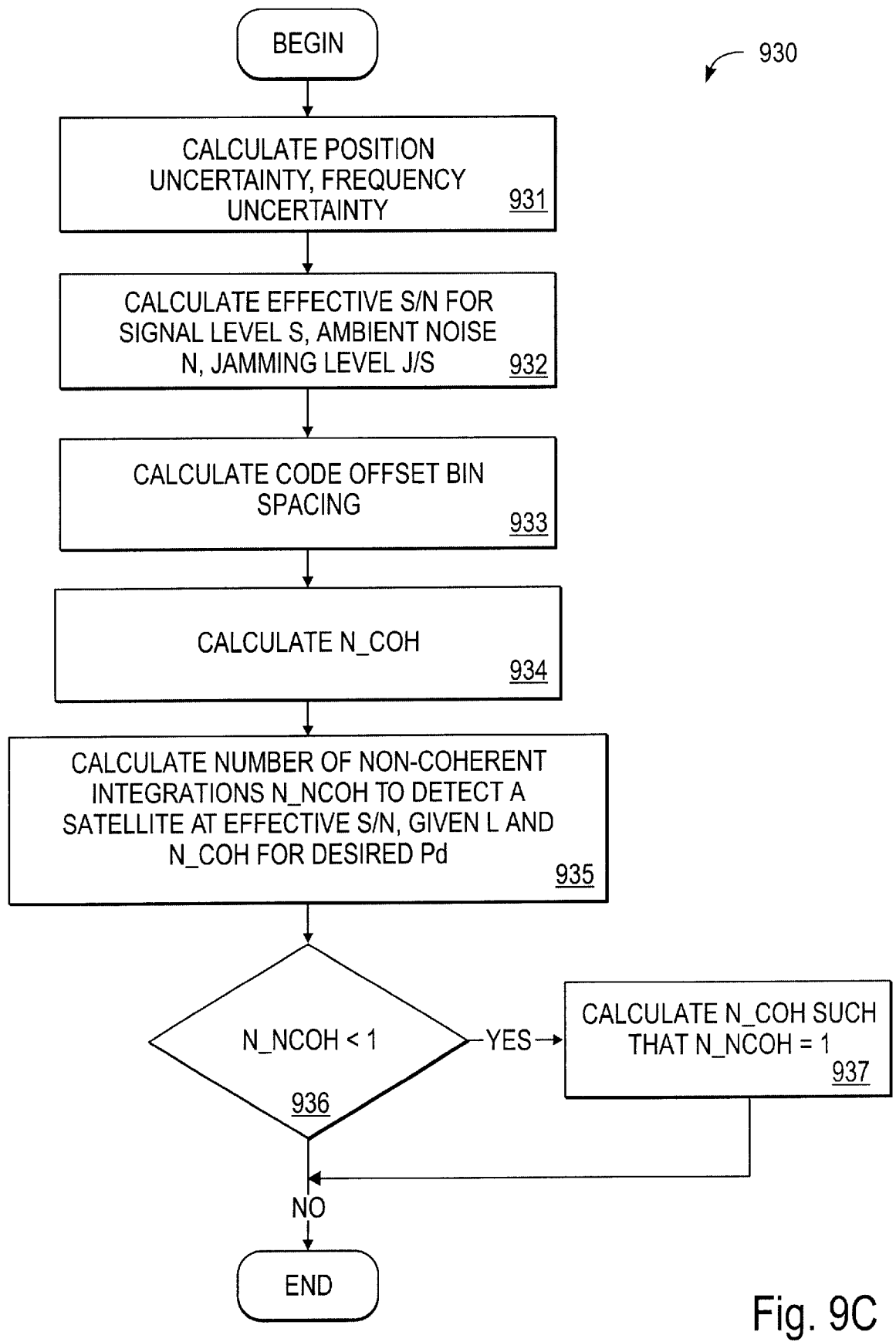
FIG. 9C is a flow diagram illustrating a routine for determining code offset bin spacing according to a second embodiment.

Thus, the weighted sum for code offset bin spacing might be computed according to the routine 930 of FIG. 9C. At 931, the position uncertainty and frequency uncertainty are calculated. Next, at 931 the effective signal-to-noise ratio S/N is computed for the signal level S, ambient noise N, and jamming-to-signal ratio J/S. Next, at 933, the code offset bin spacing is computed according to equation (2) above. At 934 N_COH is computed from equation (1) above. At 935 the required number of non-coherent integrations N_NCOH needed to detect the presence of a satellite is calculated at the effective signal-to-noise ratio S/N, with the correlation losses L and N_COH, for the desired probability of detection Pd, is computed. The method described by Mahmood et al. may be used for this computation. At 936, if the resulting N_NCOH is less than one, then at 937 N_COH is recomputed such that N_NCOH equals one, and the routine ends. If N_NCOH is equal to or greater than one at 936, then the routine ends.

Figure 10A:
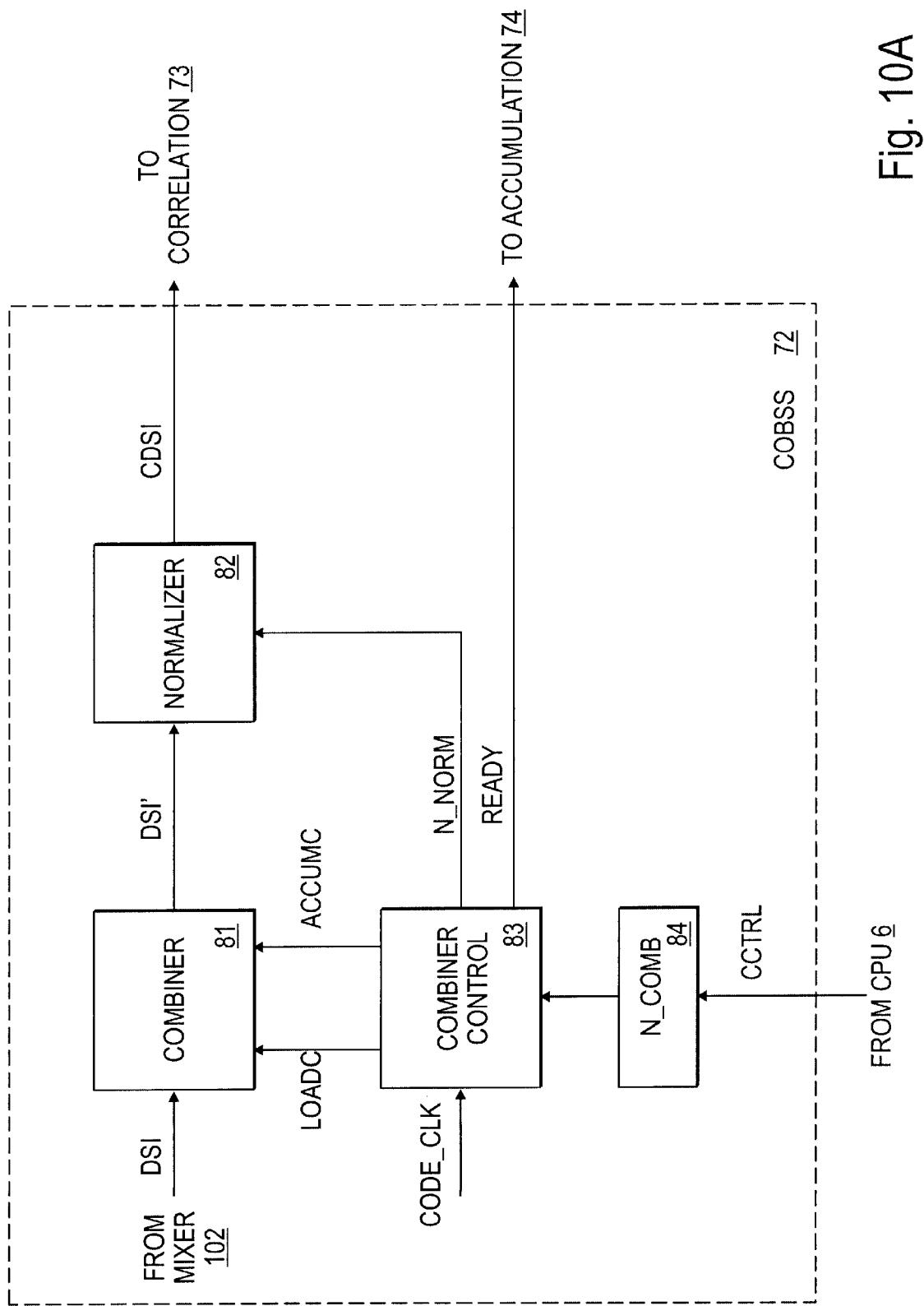
FIG. 10A is a block diagram of the code offset bin spacing stage (COBSS) of FIG. 8.

FIG. 10A illustrates the COBSS 72 in greater detail. In the illustrated embodiment, the COBSS 72 includes a sample combiner 81, a combiner control circuit 83, a normalizer 82, and a register 84. The combiner 81 combines successive samples (within signal DSI) when commanded to do so by the control circuit 83. The combiner control circuit provides signals LOADC and ACCUMC to the combiner to load samples the combiner and to command accumulation of loaded samples, respectively. Specifically, while LOADC is asserted, any samples appearing at the DSI input of combiner 81 will be loaded into the combiner 81. Loaded samples will be combined when ACCUMC is subsequently asserted. Combined samples are output by the combiner 81 as signal DSI', which is provided to the normalizer 82.

Generally, the combiner control circuit 83 selectively asserts LOADC or ACCUMC based on a value N_COMB stored in and received from register 84, which indicates the average number of successive samples to be combined. If the average number of successive samples does not divide evenly into the number of code bins, the control circuit 83 does so subject to the restriction that samples on opposite sides of a chip boundary are not combined, as noted above in connection with FIG. 9A. The value N_COMB in register 84 is set by the CPU 6 using control signal CCTRL. The control circuit 83 also receives a code clock signal CODE_CLK as input and outputs a signal, READY. In one embodiment, CODE_CLK is a 10.23 MHz clock signal for purposes of acquiring the P(Y) code or a 1.023 MHz signal for purposes of acquiring the C/A code. The READY signal is provided to the correlation stage 73 and the accumulation stage 74.

The READY signal is essentially an enable signal which, when asserted, causes the accumulation stage 74 to input the output of the correlation stage 73 in response to CLK2. The correlation stage 73 is described below in greater detail. For example, referring again to FIG. 9A, if the combiner 81 is active (not bypassed), then READY is asserted at times 95. If the combiner 81 is bypassed, however, then READY is always asserted.

The normalizer 82 generally scales the output DSI' from the combiner 81 as necessary and provides the scaled output CDSI to correlation stage 73. More specifically, the scaling operation may include either or both of two separate scaling functions. First, the normalizer 82 scales the sampled input signal DSI' down, if necessary, so that the signal can be represented using a constant, predetermined number of bits (e.g., four bits). Second, the normalizer 82 scales the sampled input signal to evenly weight the results at each successive stage of the correlation shift register 105, which is discussed below in connection with FIG. 11, to adjust for any combining of samples done by the combiner 72. More specifically, the scaling stage 104 will divide the combined value by the number of samples that were combined to form the value. The number of samples combined is indicated in a signal N_NORM provided to the normalizer 82 from the combiner control circuit 83.

Figure 10B:
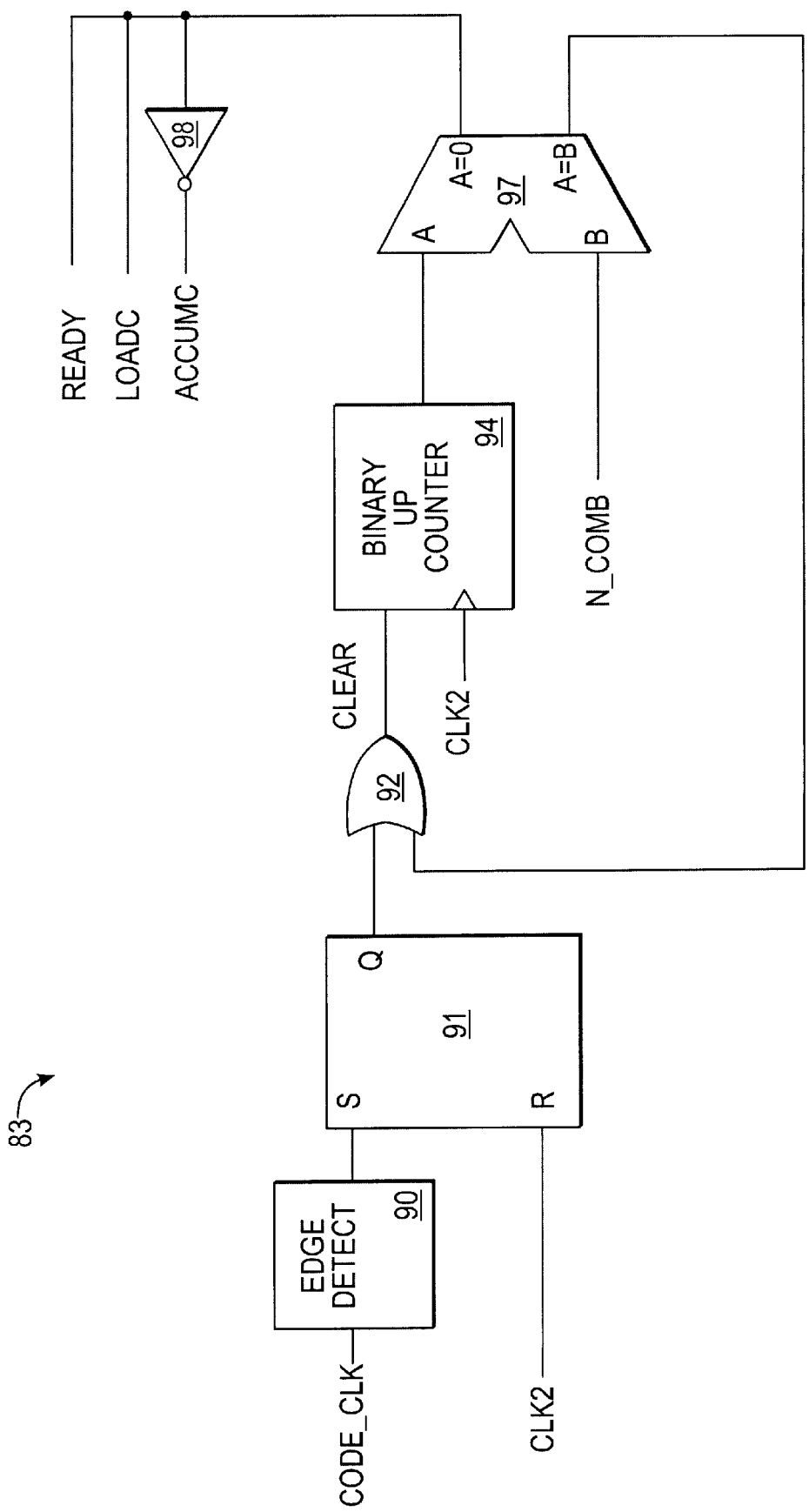
FIG. 10B is a block diagram of the combiner control circuit of FIG. 10A.

FIG. 10B illustrates the logic of the combiner control circuit 83 according to one embodiment. Control circuit 83 includes an edge detector 90, a standard S-R flip-flop 91, an OR gate 92, a binary up counter 94, a logic circuit 97, and an inverter 98. Edge detector 90 receives signal CODE_CLK as input and provides an out put to the set (S) input of flip-flop 91. The output of edge detector 90 is asserted in response to each rising edge of CODE_CLK. Clock signal CLK2 is applied to the reset (R) input of flip-flop 91. The Q output of flip-flop 91 is applied to one input of two-input OR gate 92. The other input of OR gate 92 is coupled to the "A=B" output of logic circuit 97. The output of OR gate 92 is provided to the CLEAR input of counter 94, which is clocked by CLK2. The output of counter 94 is applied to the "A" input of logic circuit 97. Logic circuit 97 also has a "B" input, which is coupled to receive the value N_COMB. Logic circuit 97 asserts its "A=0" output when the output of counter 94 is zero and asserts its "A=B" output when the output of counter 94 equals N_COMB. The "A=0" output of logic circuit 97 forms signals READY and LOADC. The "A=0" output is also passed through an inverter 98, the output of which forms signal ACCUMC.

Figure 11:
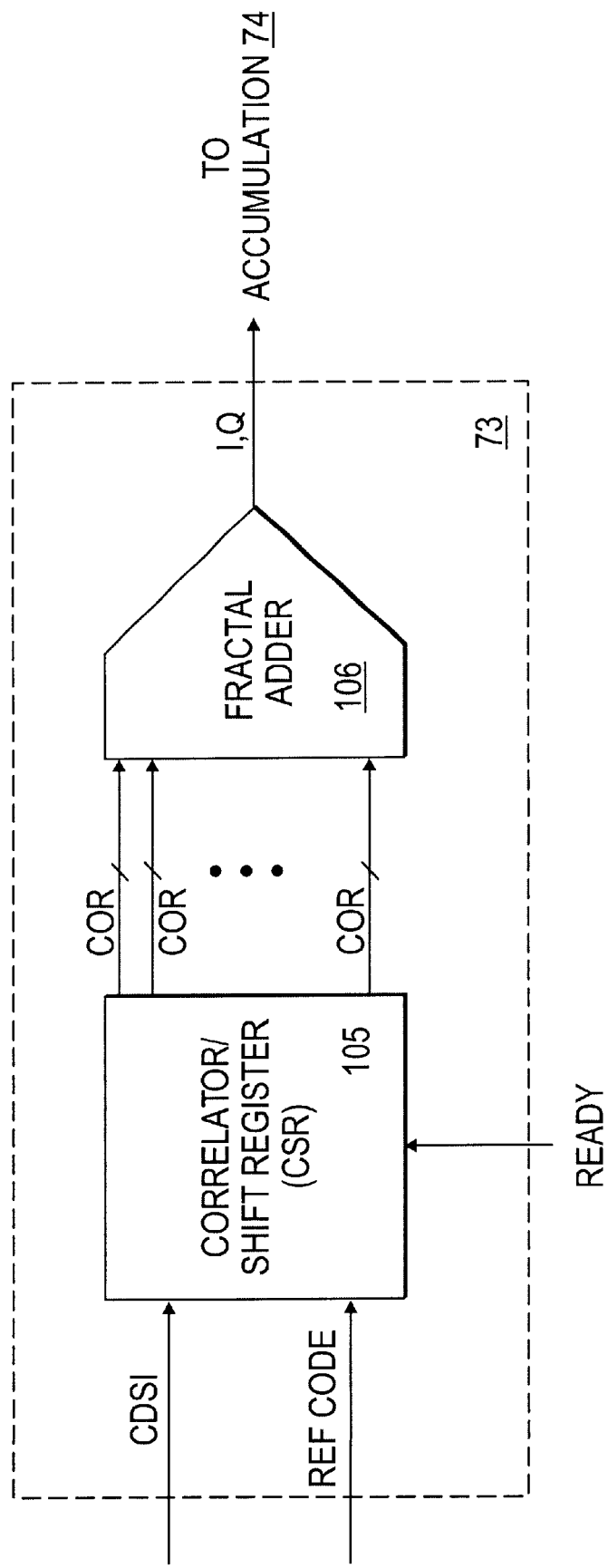
FIG. 11 is a block diagram of the correlation stage of FIG. 8.

FIG. 11 illustrates the correlation stage 73 in greater detail. In the illustrated embodiment, the correlation stage 73 includes a correlator/shift register (CSR) 105 and a fractal adder circuit 106. The CSR 105 is a serial-in/parallel-out device which receives the signal CDSI from the normalizer 82 as well as the reference code REF_CODE and the READY signal. The CSR 105 outputs m multi-bit outputs COR in parallel to the CFA 106. Each of the m outputs is a measure of the correlation of samples of the received P(Y) or C/A code and one bit of the reference code REF_CODE. As noted above, the number m is equal to the number of code offset bins per correlation segment.

The CSR 105 latches m bits of the local reference code REF_CODE at a time while shifting in the sampled, scaled input signal at the clock frequency. At each clock cycle, the scaled samples of the received signal are shifted in the CSR 105 by one bin, and the CSR 105 provides a parallel output COR to the fractal adder 106.

The fractal adder 106 provides a summation of the COR values received at its inputs, which also results in wideband filtering. The output I,Q of the fractal adder 106 is applied to the accumulation stage 74. As noted above, signal I,Q represents both in-phase and quadrature signals.

Figure 12:
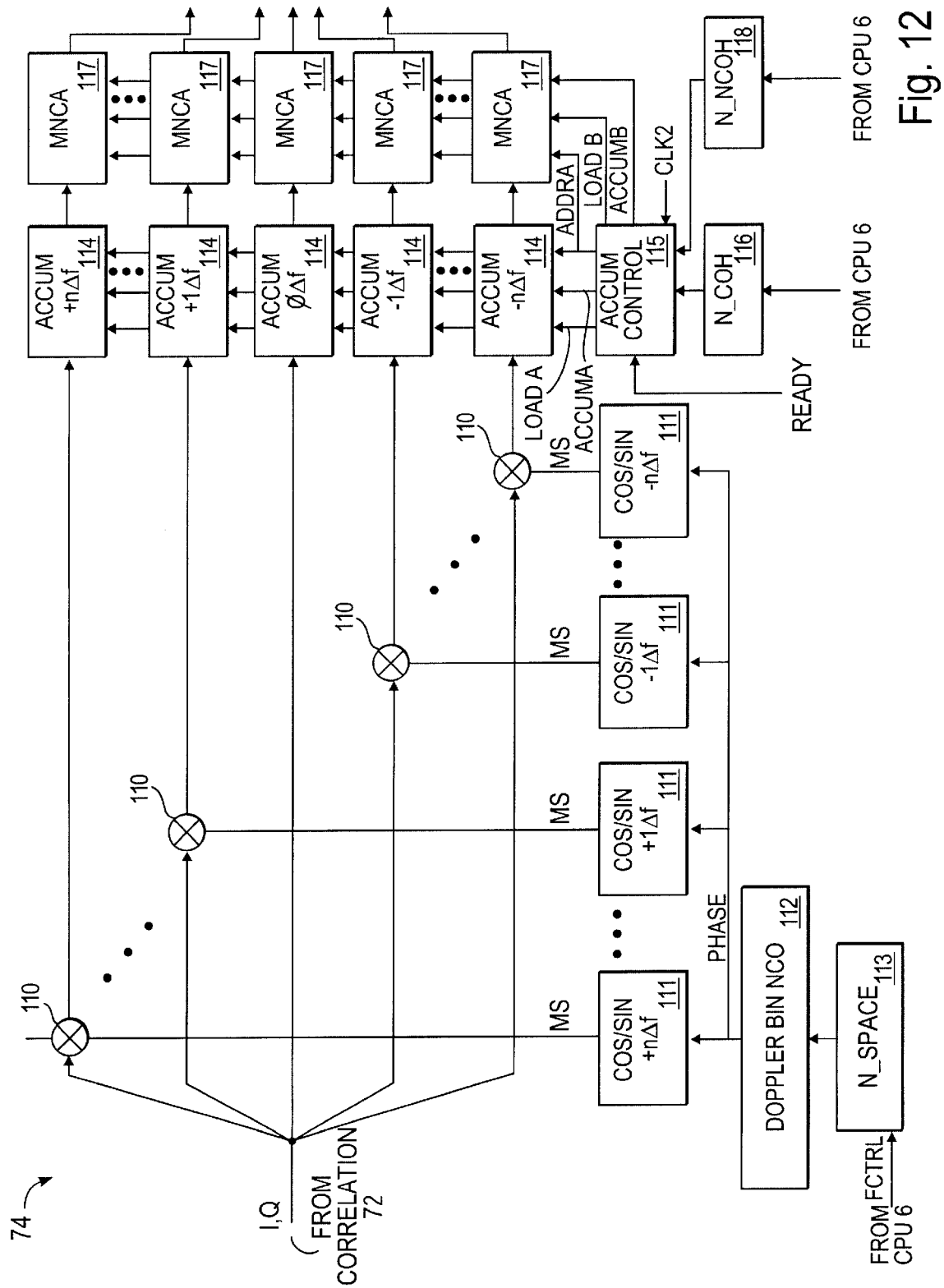
FIG. 12 is a block diagram of the accumulation stage of FIG. 8.

FIG. 12 illustrates the accumulation stage 74 in greater detail. Generally, the accumulation stage 74 creates multiple Doppler offset bins by simultaneously mixing the output I,Q of the correlation stage 72 with a number (2n) of mixing signals MS to generate a number of discrete Doppler channels. The number 2n depends upon the number of Doppler offset bins that are desired to be searched and is therefore application specific. All processing on signal I,Q and signals derived therefrom in the accumulation stage 74 is performed separately and in parallel on both the in-phase and quadrature components, until the magnitude accumulation function (MNCAs 117) described below. Hence, each of the mixing signals MS includes both sine and cosine components at an integer multiple of the basic Doppler offset $\Delta f$.

The accumulation stage 74 includes a number (2n) of mixers 110; the same number (2n) of cosine/sine generators 111; a number (2n+1) of coherent accumulators 114; a Doppler bin NCO 112; a register 113; an accumulator control circuit 115; registers 116 and 118; and a number (2n+1) of magnitude/non-coherent accumulation circuits (MNCAs) 117.

In accordance with the present invention, the spacing of the Doppler offset bins is determined by appropriately selecting the frequencies of the mixing signals MS, and the spacing can varied dynamically by altering these frequencies. Thus, signal I,Q is applied to each of mixers 110, and each of the mixing signals MS is generated by a different one of the cosine/sine generators 111 at a different integer multiple of the basic Doppler offset $\Delta f$ in either the positive or negative direction (i.e., $\pm \Delta f$, $\pm 2\Delta f$, ..., $\pm n\Delta f$). Each mixing signal MS includes both in-phase and quadrature (i.e., sine and cosine) components. The output of each cosine/sine generator 110 is applied to a different one of the mixers 111. The resulting output of each mixer 111 is applied to a different one of the coherent accumulators 114. The signal I,Q is also applied directly to one of the coherent accumulators 114 without being mixed; the unmixed signal I,Q, therefore, corresponds to zero Doppler offset (0 $\Delta f$).

A signal PHASE is input to each of the cosine/sine generators 111 from the Doppler bin NCO 112. The rate of change in the signal PHASE represents the basic Doppler offset $\Delta f$ and, therefore, the spacing of the Doppler offset bins. Each of the cosine/sine generators 111 generates its output mixing signal MS at a predetermined multiple of $\Delta f$, based on PHASE. The function of the cosine/sine generators 111 may be provided as a look-up in a look-up table using the value of PHASE. Register 113 stores a value N_SPACE, which is provided to the Doppler bin NCO 112 to control the rate of change of signal PHASE. The value N_SPACE, which is set by the CPU 6 using control signal FCTRL, may be determined dynamically based on various different parameters, such as current signals conditions, etc. See the discussion above with reference to FIG. 7A, for example.

Signal I,Q and the output of each mixer 110 is applied to a different one of the coherent accumulators 114. Accumulators 114 are digital integrator cells, which accumulate signals at their respective inputs over the coherent integration interval N_COH (separately for the in-phase and quadrature signals). Each of accumulators 114 actually includes m accumulators and generates one multi-bit parallel output for both in-phase and quadrature for each such register.

The coherent integration interval N_COH is determined by the CPU 6 and is stored in register 116. The required number of non-coherent integrations N_NCOH is stored in register 118, which is also set by the CPU 6. The accumulator control circuit 115 receives the values N_COH and N_NCOH from registers 116 and 118, respectively, and receives the READY signal from the COBSS 72. In response, the accumulator control circuit 115 generates signals LOADA, ACCUMA, and ADDRA, each of which is simultaneously provided (e.g., via a bus) to each of the coherent accumulators 114. When asserted, signals LOADA and ACCUMA cause a particular one of the registers in each of the accumulators 114, as specified by address signal ADDRA, to load or accumulate the values at its input (for both in-phase and quadrature components), respectively. As noted above, the data transfer functions of the accumulations stage 74 are clocked by CLK2 and enabled by the READY signal. Thus, if READY is not asserted, then neither LOADA nor ACCUMA can be asserted.

The accumulator control circuit 115 also generates signals LOADB and ACCUMB, which are simultaneously provided to each of the MNCAs 117. The signals LOADB and ACCUMB are activated by the accumulator control circuit 115 to update each MNCA 117 with the coherently integrated values at the completion of N_COH coherent cycles. When asserted, LOADB and ACCUMB cause a particular one of the accumulators in each MNCA 117, as specified by address signal ADDRA, to load or accumulate, respectively, the values at its input.

Each of the coherent accumulators 114 outputs m multi-bit parallel outputs to a corresponding one of the MNCAs 117 for both the in-phase and quadrature components. Each MNCA 117 receives address signal ADDRA and, based on the specified address, selects a particular one of its parallel inputs (both in-phase and quadrature) from the corresponding accumulator 114. The MNCA 117 performs non-coherent accumulation of the magnitude values at its selected input. Once the MNCA 117 performs this function on a given set of inputs, the in-phase and quadrature components in those inputs are no longer processed separately. Thus, accumulated magnitude values are output by the MNCA 117 to both the TDBC 75 and the MPDC 76, the functions of which were discussed above.

Figure 13:
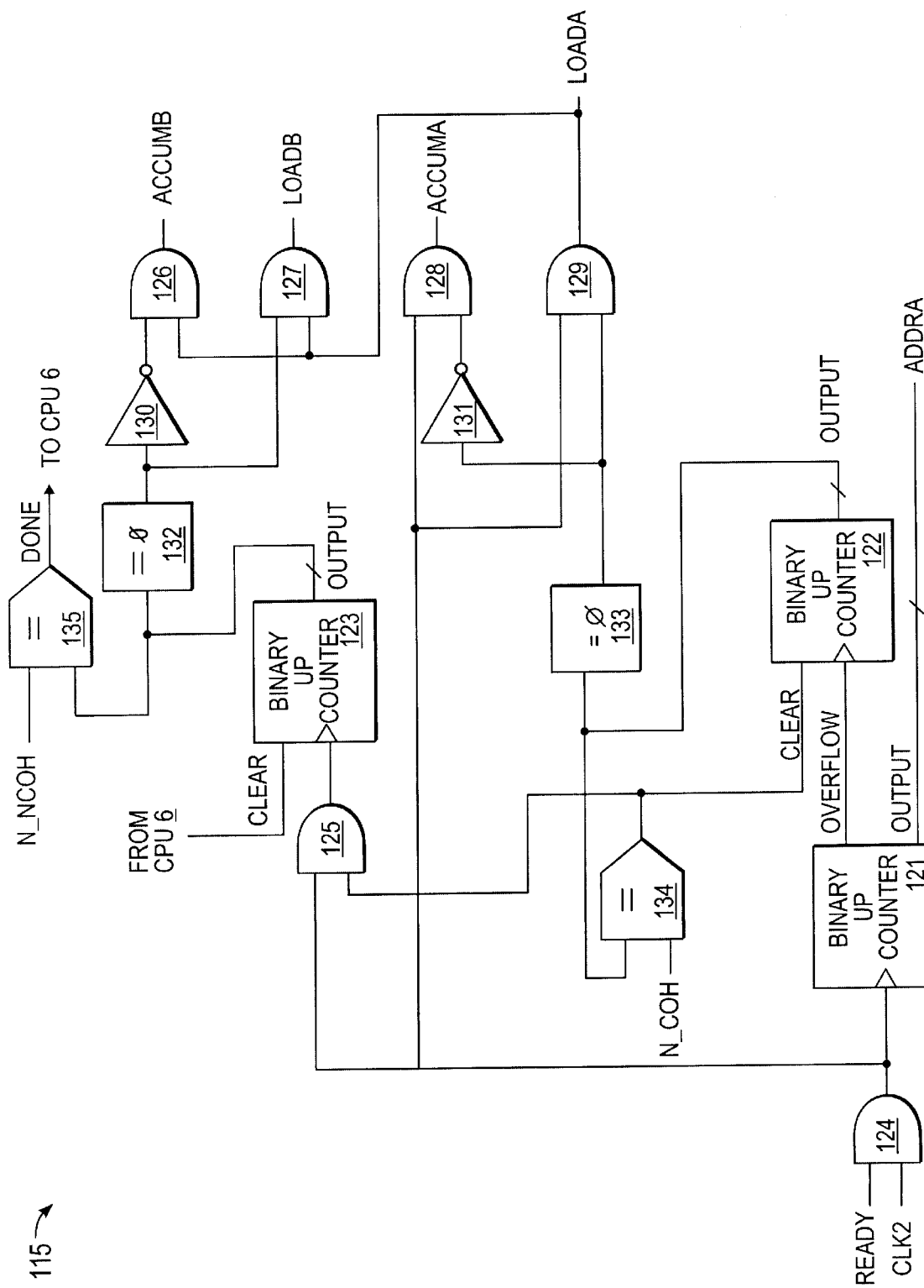
FIG. 13 is a block diagram of the accumulator control block of FIG. 12.

FIG. 13 illustrates the accumulator control circuit 115 in greater detail. In the illustrated embodiment, the circuit 115 includes binary up counters 121, 122 and 123; AND gates 124, 125, 126, 127, 128 and 129; inverters 130 and 131; logic blocks 132 and 133; and comparators 134 and 135. Note that FIGS. 7B and 7C show the relationships between the outputs of counters 121, 122, and 123 and the quantities, N_COH, T_COH, N_NCOH, and T_NCOH, discussed above.

The elements of accumulator control circuit 115 are connected as follows.

AND gate 124 receives as input the READY signal and CLK2. The output of AND gate 124 is applied to the clock input of a free-running, binary up counter 121. Counter 121 counts from zero to m−1, where m is the number of code offset bins per correlation segment, as noted above. The count output of counter 121 forms signal ADDRA. The overflow output of counter 121 is applied to the clock input of binary up counter 122. Counter 122 is used in generating signals ACCUMA and LOADA to the coherent accumulators 114 and is therefore referred to as "coherent" counter 122. The count output of coherent counter 122 is applied as input to logic block 133. Logic block 133 outputs a logic one (asserted) when the count output from coherent counter 122 is zero, and a logic zero (not asserted) otherwise. The output of logic block 133 is applied as one input of AND gate 129, which receives a second input from the output of AND gate 124. The output of AND gate 129 is signal LOADA.

Comparator 134 receives as input the value N_COH from register 116 (FIG. 12) and the count value output from coherent counter 122 and outputs a logic one when these two values are equal. The output of comparator 134 is applied to one input of AND gate 125. A second input of AND gate 125 is the output of AND gate 124. The count output of non-coherent counter 123 is applied as an input to logic block 132 and to comparator 135. Counter 123 is used in generating signals ACCUMB and LOADB to the MNCAs 117 and is therefore referred to as "non-coherent" counter 123. Logic block 132 outputs a logic one when the count output from non-coherent counter 123 is zero, and a logic zero otherwise. Comparator 135 also receives the value N_NCOH as input and outputs a signal DONE to the CPU 6. The signal DONE is logic one when the count of non-coherent counter 123 equals N_NCOH, indicating that the total integration time has elapsed (see FIG. 7A, 703 and 704).

The output of logic block 132 is applied as an input to inverter 130 and to AND gate 127. The output of inverter 130 is applied to one input of AND gate 126. The other input of AND gate 126 is the signal LOADA. The output of AND gate 126 is signal ACCUMB. A second input of AND gate is signal LOADA. The output of AND gate 127 is signal LOADB.

The output of logic block 133 is also applied to the input of inverter 131. The output of inverter 131 is applied to one input of AND gate 128. AND gate 128 receives a second input from the output of AND gate 124. The output of AND gate 128 is signal ACCUMA.

Thus, a method and apparatus have been described for acquiring a spread-spectrum signal by dynamically varying the spacing of Doppler offset bins and code offset bins. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of locating a received signal, the method comprising:
   using a search region of signal characteristics, the search region defined in terms of a plurality of bins;
   varying a spacing of the bins; and
   determining a signal characteristic associated with the received signal by locating the signal in one of the bins.

2. A method according to claim 1, wherein varying a spacing of the bins comprises dynamically varying the spacing of the bins based on a current signal environment.

3. A method according to claim 2, wherein the plurality of bins comprises a plurality of frequency offset bins, and wherein dynamically varying the spacing of the bins comprises automatically varying the spacing of the frequency offset bins based on the current signal environment.

4. A method according to claim 2, wherein the plurality of bins comprises a plurality of code offset bins, and wherein dynamically varying the spacing of the bins comprises automatically varying the spacing of the code offset bins based on the current signal environment.

5. A method of locating a signal in a search region defined in terms of a plurality of frequency offset bins, the method comprising:
   varying a spacing of the frequency offset bins; and
   attempting to locate the signal in one of the frequency offset bins.

6. A method according to claim 5, wherein varying the spacing of the frequency offset bins comprises dynamically varying the spacing of the frequency offset bins based on a current signal environment.

7. A method according to claim 5, wherein varying the spacing of the frequency offset bins comprises mixing a first signal with a second signal, the second signal having one of a plurality of programmably selectable frequencies, wherein the spacing of the frequency offset bins is a function of which of the plurality of selectable frequencies is selected.

8. A method according to claim 5, wherein the search region is further defined in terms of a plurality of code offset bins, the method further comprising varying a spacing of the code offset bins.

9. A method according to claim 8, wherein varying the spacing of the code offset bins comprises combining samples of the received signal.

10. A method of locating a received signal in a search region defined in terms of a plurality of code offset bins, the method comprising:
    varying a spacing of the code offset bins; and
    attempting to locate the signal in one of the code offset bins.

11. A method according to claim 10, wherein varying the spacing of the code offset bins comprises dynamically varying the spacing of the code offset bins based on a current signal environment.

12. A method according to claim 11, wherein varying the spacing of the code offset bins comprises combining samples of the received signal.

13. A method according to claim 10, wherein the search region is further defined in terms of a plurality of frequency offset bins, the method further comprising varying a spacing of the frequency offset bins.

14. A method according to claim 13, wherein varying the spacing of the frequency offset bins comprises mixing a first signal with a second signal, the second signal having one of a plurality of programmably selectable frequencies, wherein the spacing of the frequency offset bins is a function of which of the plurality of selectable frequencies is selected.

15. In a signal receiver, a method of locating a modulation code of a received signal, the method comprising the steps of:
- searching for a frequency of the modulation code based on a plurality of frequency offsets, the frequency offsets corresponding to offsets between a frequency of the modulation code and a frequency of a reference code;
- searching for a code offset of the modulation code based on a plurality of code offsets, the code offsets corresponding to temporal offsets between the modulation code and the reference code, wherein the frequency offsets and the code offsets form a plurality of bins of a search region; and
- automatically varying a spacing of the bins.

16. A method according to claim 15, wherein automatically varying a spacing of the bins comprises dynamically varying a spacing of the bins based on a current signal environment.

17. A method according to claim 16, wherein the bins comprise a plurality of code offset bins, and wherein automatically varying the spacing of the bins comprises combining samples of the received signal to vary the spacing of the code offset bins.

18. A method according to claim 16, wherein the bins comprise a plurality of frequency offset bins, and wherein automatically varying the spacing of the frequency offset bins comprises mixing a first signal with a second signal, the second signal having one of a plurality of programmably selectable frequencies, wherein the spacing of the frequency offset bins is a function of which of the plurality of selectable frequencies is selected.

19. A method of searching for a received signal within a search region, the search region characterized by a plurality of frequency offset bins and a plurality of code offset bins, the method comprising the steps of:
- sampling the received signal to generate a first plurality of samples;
- determining a combining scheme based on a current signal environment, the combining scheme for determining a spacing of the code offset bins within the search region;
- combining at least some of the first plurality of samples based on the combining scheme to generate a second plurality of samples;
- correlating the second plurality of samples with a reference code to generate correlation measures;
- determining a first frequency based on the current signal environment, the first frequency for determining a spacing of the frequency offset bins within the search region;
- generating a first plurality of signals, each of the first plurality of signals having a frequency based on the first frequency;
- mixing each of the first plurality of signals with a signal representing the correlation measures to generate a second plurality of signals; and
- using the second plurality of signals to locate the received signal within the search region.

20. A method according to claim 19, wherein generating the first plurality of signals comprises generating each of the first plurality of signals at a different multiple of the first frequency.

21. A method according to claim 19, wherein the received signal comprises a spread-spectrum signal.

22. A method according to claim 19, wherein the received signal comprises a code division multiple access (CDMA) signal.

23. A method according to claim 19, wherein the received signal comprises a satellite positioning system course acquisition code.

24. A method according to claim 19, wherein the received signal comprises a satellite positioning system precise positioning code.

25. A receiver for searching for a signal within a search region, the search region defined in terms of a plurality of bins, the receiver comprising:
- a sampler for sampling an input signal; and
- a combiner coupled to the sampler stage, the combiner for combining at least some of the samples based on a first control input, such that a spacing of the bins is variable based on the first control input.

26. A receiver according to claim 25, wherein the combiner selectively combines the samples based on a current signal environment.

27. A receiver according to claim 25, further comprising:
- a correlator coupled to the combiner, the correlator generating correlation measures associated with the samples and a second signal; and
- a mixer coupled to receive a third signal representative of the correlation measures, the mixer mixing the third signal with a fourth signal, the fourth signal having a frequency based on a second control input, such that the spacing of the bins is further variable based on the second control input.

28. A receiver according to claim 25, wherein the second signal represents a locally generated reference code, and wherein the correlation measures correspond to a correlation between the reference code and a code modulating the input signal.

29. A receiver according to claim 25, further comprising a normalizer, the normalizer coupled to receive an output of the combiner including combined samples of the input signal, the normalizer normalizing the combined samples as a function of said combining.

30. A signal receiver comprising:
- input means for receiving a signal from a remote transmission source, the signal being modulated by a modulation code; and
- search means for locating the modulation code, the search means including:
  - means for searching for the signal within a search region, the search region defined in terms of a plurality of frequency offset bins; and
  - means for varying a spacing of the frequency offset bins.

31. A signal receiver according to claim 30, wherein the means for varying the spacing of the frequency offset bins comprises means for automatically and dynamically varying the spacing of the frequency offset bins.

32. A signal receiver according to claim 30, wherein the means for varying the spacing of the frequency offset bins comprises a programmable rate mixer.

33. A signal receiver according to claim 30, wherein the search region is further defined in terms of a plurality of code offset bins, the search means further comprising means for varying a spacing of the code offset bins.

34. A signal receiver according to claim 33, wherein the means for varying the spacing of the code offset bins comprises a programmable combining stage, the programmable combining stage for combining samples of the signal as a function of a control input.

35. A signal receiver according to claim 34, further comprising scaling means for scaling outputs of the programmable combining stage as a function of said combining.

36. A positioning system receiver comprising:
- a sampling stage for inputting and sampling a received signal and for outputting samples of the received signal; and
- a search stage coupled to the sampling stage for locating the received signal within a search region, the search stage including:
  - a combiner coupled to receive the samples, the combiner combining at least some of the samples based on a first control input;
  - a correlation stage coupled to receive a first signal representative of combined samples output by the combiner and coupled to receive a reference signal, the correlation stage generating a correlation signal representing correlation measures associated with the first signal and the reference signal; and
  - an accumulation stage including:
    - an oscillator coupled to receive a second control input, the oscillator outputting a second signal having an offset frequency based on the second control input; and
    - a plurality of mixers, each coupled to receive the correlation signal and a different one of a plurality of mixing signals, each of the plurality of mixing signals having a different frequency derived from the offset frequency, each of the mixers outputting a different mixed signal; and
    - a plurality of accumulators, each coupled to receive one of the mixed signals and to output accumulation measures thereof.

37. A receiver according to claim 36, wherein the reference signal corresponds to a course positioning code generated locally within the receiver, and wherein the correlation measures represent a correlation between the course positioning code and a course positioning code modulating the received signal.

38. A receiver according to claim 36, wherein the reference signal corresponds to a precise positioning code generated locally within the receiver, and wherein the correlation measures represent a correlation between the precise positioning code and a precise positioning code modulating the received signal.

39. A receiver according to claim 35, wherein the search region is defined in terms of a plurality of code offset bins, and wherein the combiner combines at least some of the samples based on the control input to vary a spacing of the code offset bins.

40. A receiver according to claim 39, wherein the search region is defined in terms of a plurality of frequency offset bins, and wherein a spacing of the frequency bins is variable based on the second control input.

* * * * *